INVENTORS:
THOMAS A. BENHAM
JOEL MALVERN BENJAMIN, JR.
BY Howson & Howson
ATTYS.

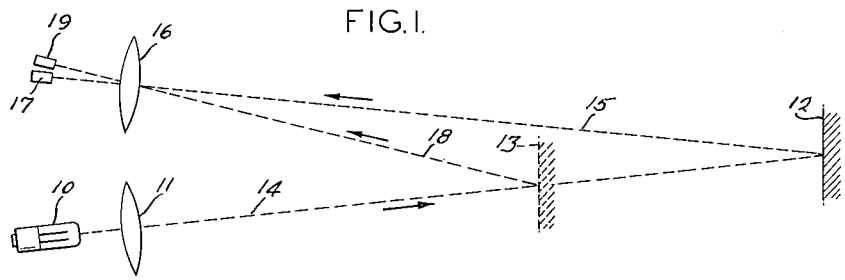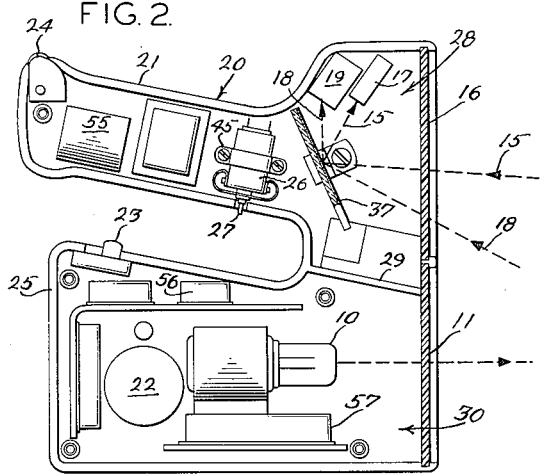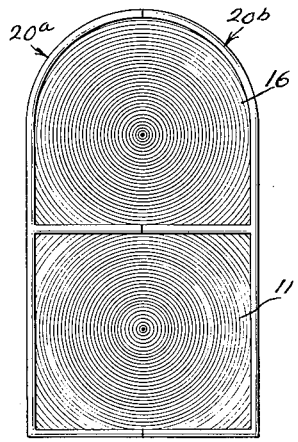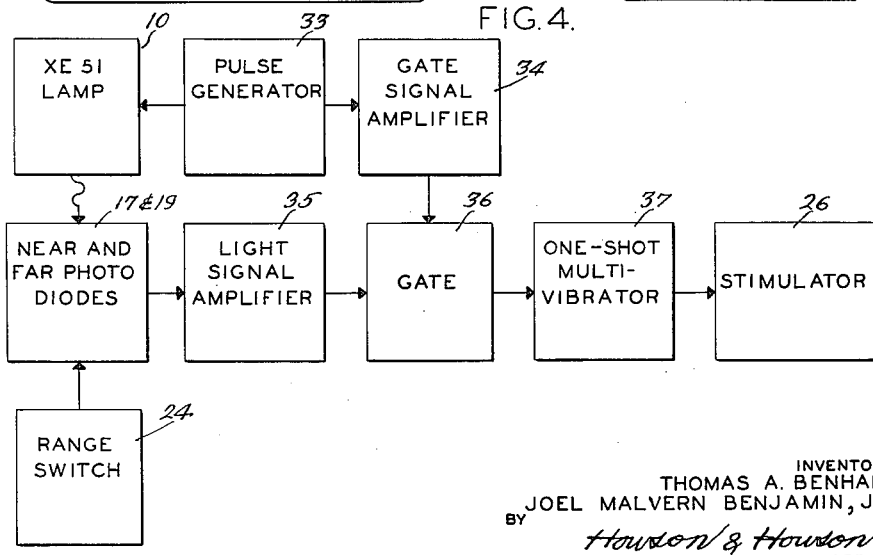

Aug. 3, 1965 T. A. BENHAM ETAL 3,198,952
PHOTOSENSITIVE OBSTACLE AND CURB
DETECTION DEVICE FOR THE BLIND
Filed Sept. 15, 1961 13 Sheets-Sheet 4
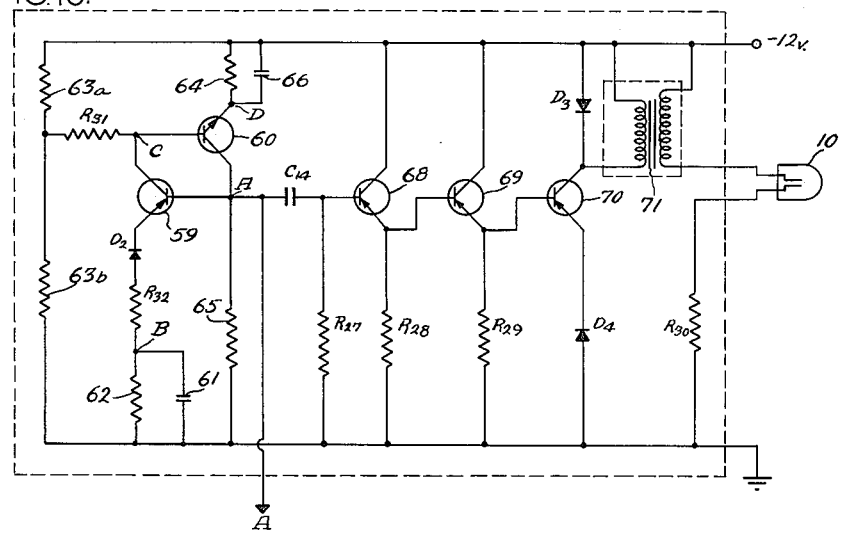
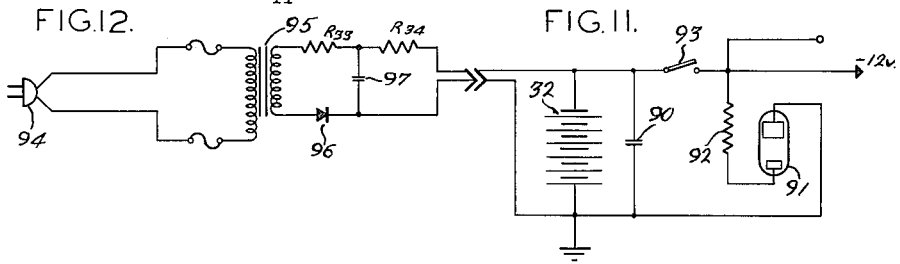
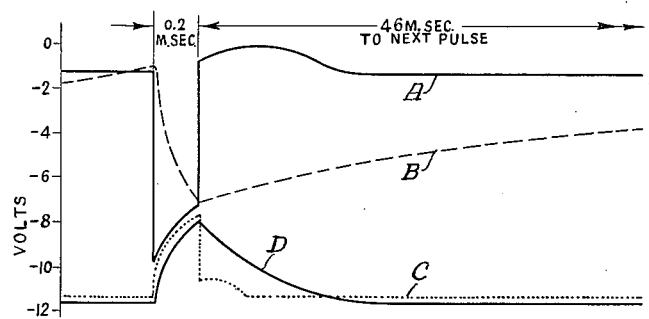
INVENTORS:
THOMAS A. BENHAM
JOEL MALVERN BENJAMIN, JR.
BY Howson & Howson
ATTYS.

Aug. 3, 1965 T. A. BENHAM ETAL 3,198,952
PHOTOSENSITIVE OBSTACLE AND CURB
DETECTION DEVICE FOR THE BLIND
Filed Sept. 15, 1961 13 Sheets-Sheet 5
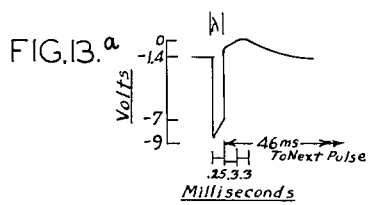
FIG.13.a
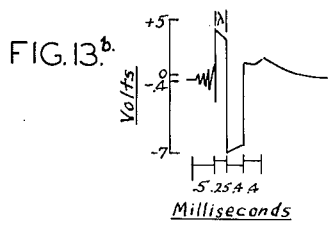
FIG.13.b
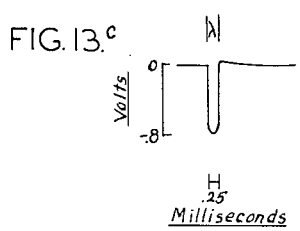
FIG.13.c
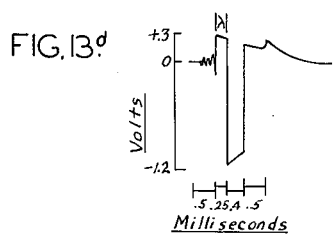
FIG.13.d
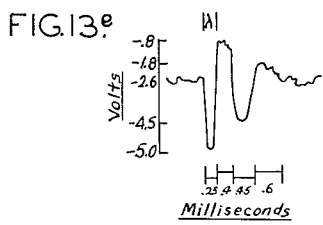
FIG.13.e
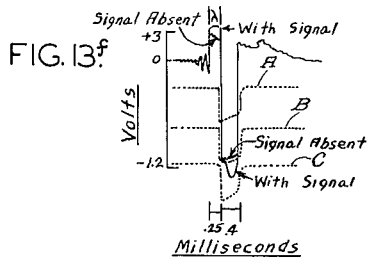
FIG.13.f
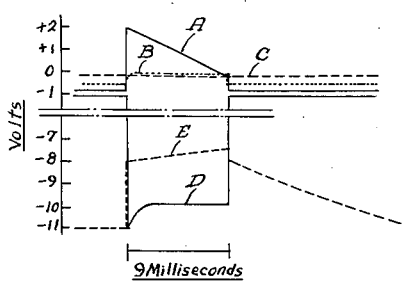
FIG.14.
INVENTORS:
THOMAS A. BENHAM
JOEL MALVERN BENJAMIN, JR.
BY Howson & Howson
ATTYS.

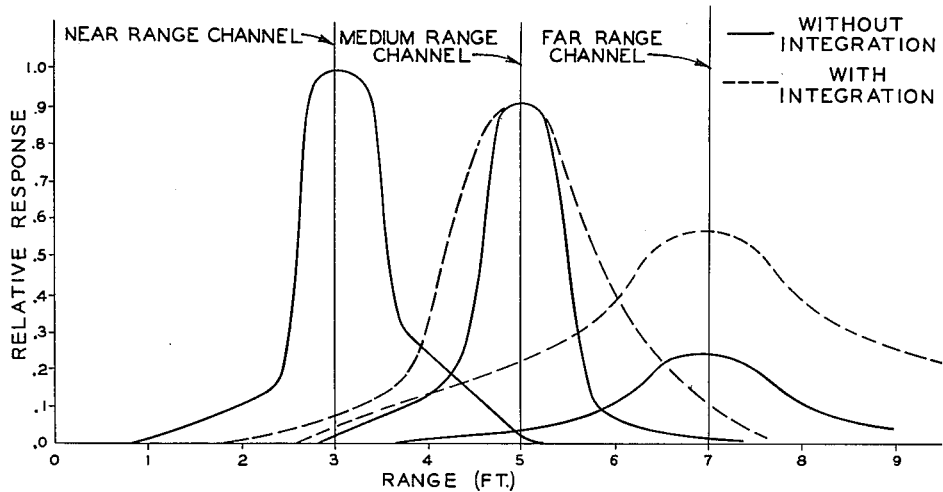
FIG.15.ᵃ
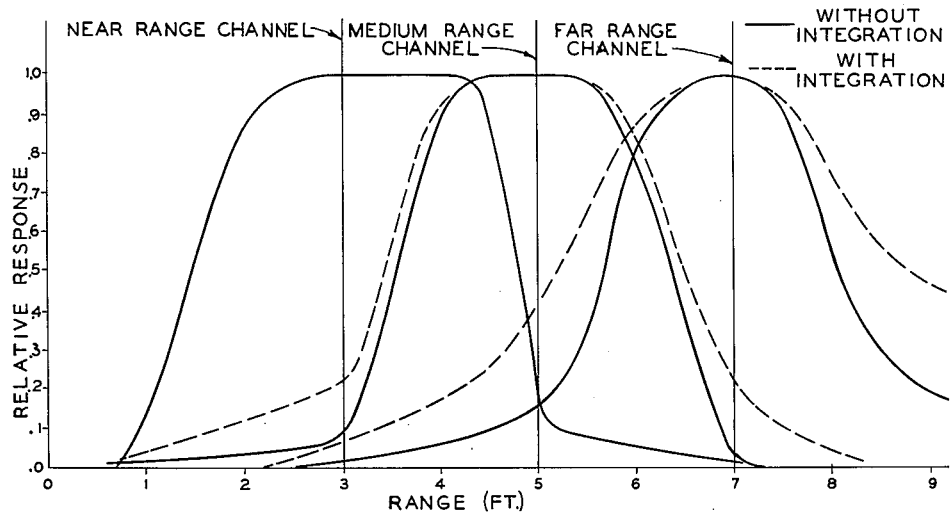
FIG.15.ᵇ

Aug. 3, 1965 T. A. BENHAM ETAL 3,198,952
PHOTOSENSITIVE OBSTACLE AND CURB
DETECTION DEVICE FOR THE BLIND
Filed Sept. 15, 1961 13 Sheets-Sheet 7
FIG.16.ª
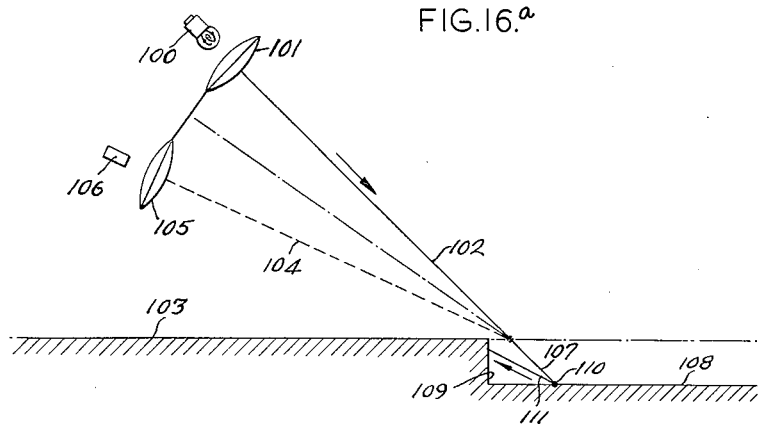
FIG.16.ᵇ
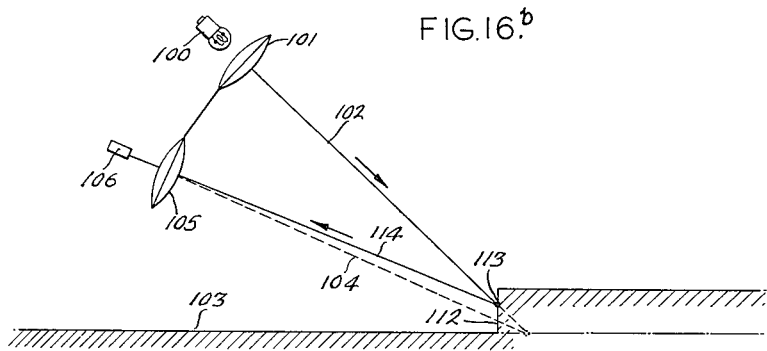
FIG.16.ᶜ
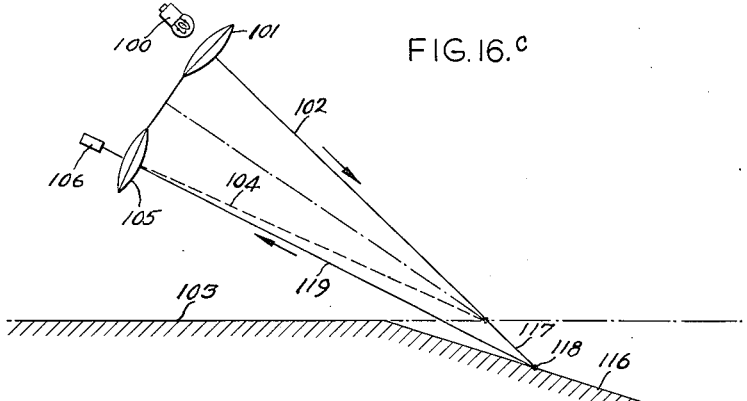
INVENTORS:
THOMAS A. BENHAM
JOEL MALVERN BENJAMIN, JR.
BY Howson & Howson
ATTYS.

INVENTORS:
THOMAS A. BENHAM
JOEL MALVERN BENJAMIN, JR.
BY Howson & Howson
ATTYS.

INVENTORS:
THOMAS A. BENHAM
JOEL MALVERN BENJAMIN, JR.
BY Howson & Howson
ATTYS.

Aug. 3, 1965    T. A. BENHAM ETAL    3,198,952
PHOTOSENSITIVE OBSTACLE AND CURB
DETECTION DEVICE FOR THE BLIND
Filed Sept. 15, 1961    13 Sheets-Sheet 12

INVENTORS:
THOMAS A. BENHAM
JOEL MALVERN BENJAMIN, JR.
BY
Howson & Howson
ATTYS.

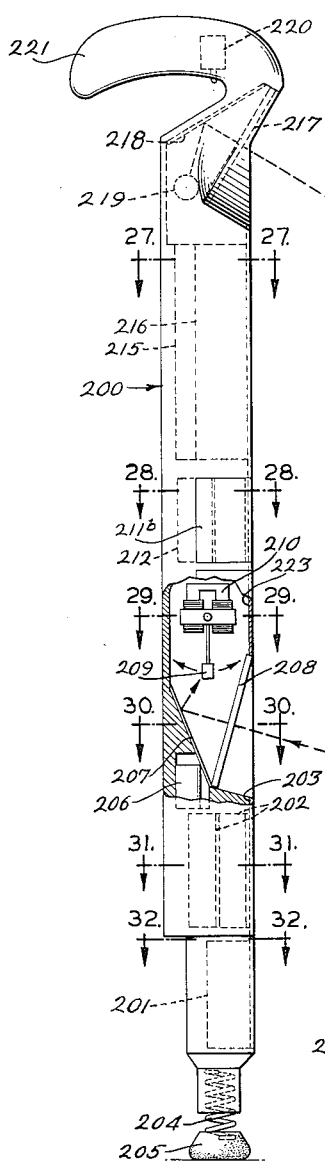
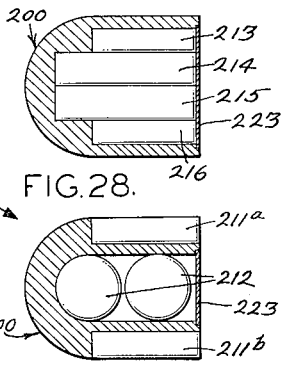
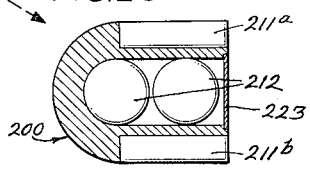
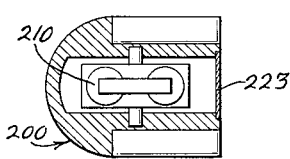
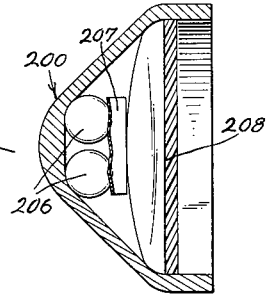
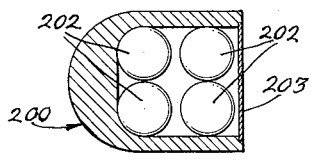
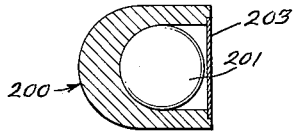
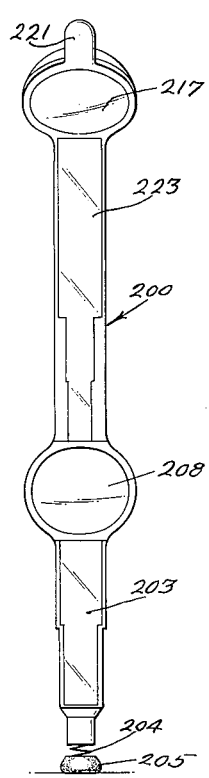

3,198,952
PHOTOSENSITIVE OBSTACLE AND CURB
DETECTION DEVICE FOR THE BLIND
Thomas A. Benham, Haverford, and Joel Malvern Benjamin, Jr., Philadelphia, Pa., assignors to The Corporation of Haverford College, Philadelphia, Pa., a nonprofit corporation
Filed Sept. 15, 1961, Ser. No. 138,524
25 Claims. (Cl. 250—221)

This invention concerns an obstacle and curb detection device for the blind which employs visible or near visible light in a triangulation system. The device includes a light source and a light detector sensitive to non-specular reflections of light from the source together with various optical, mechanical and/or electronic means. There may be detected alternatively the presence and approximate range of obstacles or the presence of curbs, including up-steps, down-steps or slopes greater than a certain amount. In addition to devices for curb detection, obstacle detection, and the like, the present invention is directed to a method of obstacle or curb detection.

Altogether about twenty guidance devices working on a variety of principles have been built since the end of World War II. The majority of these are described in the book edited by Paul A. Zahl entitled "Blindness, Modern Approaches to the Unseen Environment," Princeton University Press, 1950. This book details operation of these devices and evaluates their performance.

Throughout the development of guidance devices of all types, perhaps the greatest emphasis has been placed upon systems by which an otherwise able-bodied individual, lacking only vision, could find his way about safely at a reasonable walking speed of three to four miles an hour. The individual's reaction time, stumble recovery, and general physical condition are expected to be normal and perhaps even somewhat highly developed. Most investigators have been concerned solely with the detection of substantial obstacles such as walls or doors, but with increased study the importance of the down-step problem has been appreciated and attempts have been made to detect down-curbs as well as obstacles. Although the up-step problem is superficially related to the obstacle detection problem, it is clearly of a further order of difficulty.

Work leading to the present invention was carried out under Research Contract #V1001M-1900 from the Research Division, PSAS of the Veterans Administration to Haverford College and subcontracted to Biophysical Electronics, Inc. Details of the areas investigated and the results accomplished under this contract are discussed in a summary report entitled "Electronic Obstacle and Curb Detectors for the Blind."

In accordance with the present invention, devices have been provided which enable the blind to detect hazards during travel more effectively than has been possible heretofore. One type of device embodying the present invention detects obstacles and roughly indicates their proximity. In addition to large obstacles such as walls, and the like, which are already detectable by auditory cueing, obstacles such as chairs, posts, lamp posts, fire hydrants, projecting mail boxes, trash cans, and doors standing ajar may be located by the user of the obstacle detector and avoided. Moving obstacles, such as pedestrians, can also be detected and avoided by the user. Another type of device embodying the present invention enables positive detection of down-steps and holes over a certain depth below the foot level of the user. By "down-steps and holes" are meant downward curbs, downgoing flights of stairs, edges of train platforms, docks, open manholes, and cellarways. In addition, this device is capable of detecting up-steps or low obstacles above a certain height as exemplified by curbs, low steps and similar stumbling blocks which may well be too small to be detected by other methods used primarily for detecting obstacles such as walls and doors.

Two optical triangulation devices employing visible light have heretofore been given careful consideration. The first is a device developed by the U.S. Army Signal Corps and later manufactured on a limited scale by the Radio Corporation of America. This device operates briefly as follows: A beam of light interrupted 500 times per second emanates in a narrow beam from an optical system, strikes an object or the ground and is diffusely reflected back into a second optical system. The second optical system focuses the image of the spot of light reflected from an obstacle on a coding disc behind which is located a photoelectric cell. The output of this photoelectric cell is fed through an electronic amplifier, tuned to 500 cycles, to a vibrator in the handle of the instrument. The coding disc interrupts the reflected light 4, 8, 16 or 32 times per second depending upon the position of the beam which is a function of the distance to the obstacle. The rate of vibration of the vibrator in the handle depends upon the frequency of light pulses after passing through the code disc and hence informs the user as to the distance to an obstacle or discontinuity in the terrain. By positioning the handle to point the instrument in different directions an indication of size and bounds of the obstacle as well as its distance may be obtained.

Another optical triangulation device using visible light was built by Dr. Clifford M. Witcher at Massachusetts Institute of Technology, who extended the work to the detection of down-steps or curbs. This device projects a beam of light downwardly from its carrying case and scans the beam back and forth along the ground nearer and farther from the user. The beam is projected through the lower of two lenses while a photocell is placed behind the upper lens. So long as the spot is on level or uniformly sloping ground the optical system receives a solid uninterrupted spot of light. If, however, the beam of light projects over the edge of a curb, there is a momentary interruption in the spot because the curb casts a shadow, and an audible signal results.

The present device constitutes an improvement over both of the aforementioned devices as well as other prior art. The invention has been divided into two devices, one for detection of obstacles and the other for detection of curbs, either step-up or step-down. Both devices are dependent for their operation upon triangulation of light, and both devices employ a technique of pulsing the light before projecting. Moreover, the means forming pulses of light also acts to provide a synchronized gating function aiding in discrimination against ambient light and transient effects. The obstacle detector employs one or more photodetector elements and, where the detector is fixed relative to the lens, a plurality of detector elements are arranged so that light reflected from objects will fall on different elements or combinations thereof to provide some indication of range. Only rough range detection has been found necessary, and this is accomplished through a switching technique. The range switch may allow the selection of separate stimulators representing separate channels from the individual receivers, or it may employ a single stimulator to indicate to the user whether the obstacle is within the range selected.

A movable photodetector is preferably used in the curb detector. The principle of operation of the curb detector depends either upon the complete loss or hiding of the received light or upon the rapid movement of the received light spot above a predetermined rate. In either situation a signal is produced. The movement may be accomplished by either a scanning technique or a servoing technique. The servoing technique has been used to advantage by limiting the speed of response of the servo so that in the case where speed of the light spot exceeds a predetermined rate, the detectors under servo control will be unable to follow movement of the light and a signal will be generated.

Some elements of novelty include a tactile stimulator of novel design employing no end stops and hence free of impact vibration. Also certain circuits have a novel configuration of components. These and other novel features of the present invention will appear from the following drawings in which:

FIG. 1 is a schematic diagrammatic illustration showing the principle of triangulation as applied to the obstacle detector of the present invention;

FIG. 2 is a vertical sectional view taken through the casing of the obstacle detector instrument and showing in elevation some of the principal elements thereof;

FIG. 3 is a front elevational view of the obstacle detector of FIG. 2;

FIG. 4 is a block diagram showing the operation of the device of FIGS. 2 and 3;

FIG. 10 is a circuit diagram showing the pulse generator and the lamp drive circuit of the obstacle detector;

FIG. 10a is a plot of potential vs. time of various points in the circuit of FIG. 10;

FIG. 11 is the power supply for the dual range obstacle detector;

FIG. 12 is a circuit diagram of the battery charger of the dual range obstacle detector;

FIGS. 13a–13f are a series of oscillograms of voltage versus time waveforms at various places in the circuit of the obstacle detector at and near the time of a light pulse;

FIG. 14 is a voltage diagram showing operation of the one shot multivibrator for driving the stimulator of the obstacle detector;

FIGS. 15a and 15b are diagrams showing relative response at different ranges with and without integration;

FIGS. 16a–16c are schematic diagrams showing the operation of optics of the curb detector under different signal producing circumstances;

FIG. 26 is an embodiment of the curb detector in a cane-like structure, shown partially in sectional and partially in elevation view with interior construction shown in phantom;

FIG. 27 is a sectional view taken along line 27—27 of FIG. 26;

FIG. 28 is a sectional view taken along line 28—28 in FIG. 26;

FIG. 29 is a sectional view taken along line 29—29 in FIG. 26;

FIG. 30 is a sectional view taken along line 30—30 in FIG. 26;

FIG. 31 is a sectional view taken along line 31—31 in FIG. 26;

FIG. 32 is a sectional view taken along line 32—32 in FIG. 26;

FIG. 33 is a front elevational view of the cane structure of FIG. 26; and

Figure 5:
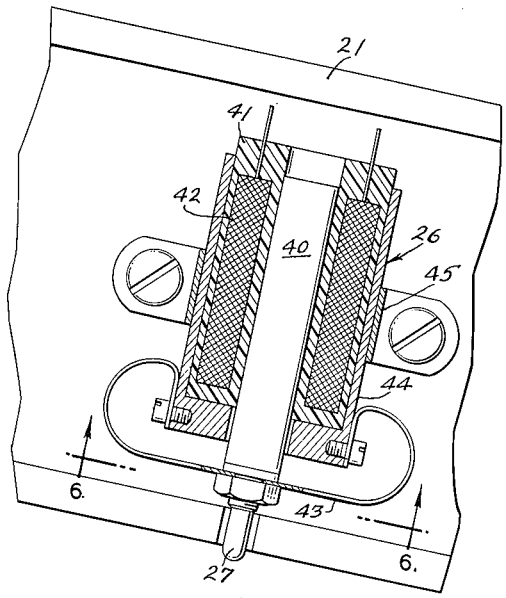
FIG. 5 is a preferred embodiment of the tactile stimulator of the present invention shown in axial section.

FIG. 1 illustrates the triangulation principle used by the obstacle detector of the present invention. As can be seen in this diagram a light source 10 is focused by a source lens 11 into a beam of generally parallel rays. In the diagram are two obstacles, one within each of the different ranges detectable by a dual range device having ranges, for example, 2 to 6 feet and 5 to 10 feet, respectively. The solid line wall 12 represents an obstacle in the far range, and, if the beam 14 strikes no obstacle before wall 12, light reflected back along beam 15 will be focused by receiving lens 16 onto photodiode 17. On the other hand, if beam 14 strikes an intermediate wall or obstacle 13 within the near range, light will be reflected back along the path 18 and focused by lens 16 upon the upper photodiode 19. Each of the elements 10, 11, 16, 17 and 19 of the optical system is fixed with respect to the other. In accordance with the present invention light from source 10 is pulsed and light which is received at the photodiodes 17 and 19 is converted into an electric current which is subjected to gating in order to discriminate between ambient light of substantially all types and that produced by the light source 10.

The instrument casing, generally designated 20, consists of symmetrical opposed shells 20a and 20b of mirror image form, symmetrical about the vertical median plane along which FIG. 2 is taken. These shells are formed of moulded fiber glass reinforced epoxy, or other suitable rugged, lightweight, substantially rigid durable material. The shells are held together by suitable bolts or other appropriate attachment means. Considerable areas of the inside of the casing shells are painted with conducting paint and grounded for shielding purposes. The components are preferably fixed in place in one of the shells, and the other shell is used as a lid. Each of the shells is provided with grooves to hold the plastic Fresnel lens windows 11 and 16 which serve the double function of producing the needed focusing and completing the closed casing. A removable panel is preferably provided in the shell providing the lid to give ready access to test points, to the lamp for replacement, and to a "Chronister" used to log the hours of use of the instrument. The device is shaped so that a part of the casing provides a handle 21 but rings, or the like, may be fixed to the casing for shoulder straps when the instrument is not in use. The handle is positioned at an angle with the horizontal, slanting downwardly toward the front of the device. This feature of the invention permits the device to accommodate to the normal position of the hand at the user's side to keep the instrument horizontal, thus avoiding the necessity of compensation for the slight forward slant of the hand in normal carrying position. The angle of slant of the handle is carefully selected to achieve this end. Some of the other components within the case are battery 22 for supplying power, the on-off switch 23 for preventing drain on the battery when the device is not in use and a range switch 24. On-off switch 23 projects through an upper wall of portion 25 of the casing which extends backward below the handle 21. Range switch 24 also projects through the top of the casing at the back of the handle 21 in position to be actuated by the hand in a convenient motion. Also positioned in the handle 21 in position to be convenient to the index finger of the user is the tactile stimulator 26. The stimulator is positioned so that its blunt probe 27 extends through the casing. The handle portion 21 broadens into detector chamber 28, separated by wall 29 from light source chamber 30 which extends back to wall portion 25. Within chamber 28 a front aluminized plastic mirror 37 is fixed with respect to the sidewalls in position to deflect to the photodiodes 17 and 19 light from source 10 reflected back from an obstacle. Use of the mirror saves space in the critical region needed for the tactile stimulator by effectively folding back the light so that the photodiodes 17, 19 do not have to be located the full focal length of the lens behind the lens 16.

A better understanding of the system and its operation in general may be had by referring to the block diagram of FIG. 4. Pulse generator 33 produces pulses 200 to 250 microseconds wide at the rate of 22 per second, for example (see FIG. 13a). These pulses are amplified and used to excite a xenon lamp 10. The signal from the pulse generator also provides a pulse to gate signal amplifier 34. The train of narrow pulses from pulses of light from the lamp 10 may be picked up by either or both of the photodiodes 17, 19. Diode 17 may be selectively removed from the circuit by the manually operated range selector switch 24. The user knows by selector switch position whether diode 17 is in the circuit or not and hence whether the range is limited to near obstacles or extended by activation of diode 17. The signal received at the amplifier and eventually felt at the stimulator is the same no matter what range, but the user knows that if a signal is picked up when diode 17 is in use but not when it is out, the obstacle must be within the far range. The amplifier 35 amplifies a signal from the selected diode(s) and feeds it through gate 36 which is opened by the synchronized pulse from pulse generator 33 and amplifier 34. Signals from light signal amplifier 34 passing through gate 36 pass to one shot multivibrator 37 due to the coincidence of the pulses at the gate 36. Between pulses of light the gate is closed so that the multivibrator 37 is not actuated even if light should fall on the photodiodes. Moreover, unless the pulses are of a certain amplitude the multivibrator 37 will not be actuated (see FIG. 14). Should the multivibrator be actuated, it will, in turn, act upon stimulator 26 to supply a signal, preferably a poke by a tactile stimulator to the finger of the user.

The far diode 17 is mounted at the focal point for reflections from distant obstacles whereas the upper or near diode is at the focal point for reflections from close obstacles. The range switch 24, when pressed, cuts out the far diode so that only obstacles within the near range can be sensed. At other times preferably both diodes are active. Photodiode currents are amplified by the light signal amplifier and the output of the pulse generator is also amplified by the gate signal amplifier which has the effect of opening the gate at the correct moment to receive any pulse from the light signal amplifier which could have resulted from a reflection of a flash from the xenon lamp. The gate is closed at all other times in order to discriminate against light from various other sources. If the light signals are large enough they will trip the one shot multivibrator. If not, no stimulus will be imparted to the operator. When triggered the multivibrator circuit produces a pulse of sufficient magnitude to drive the stimulator causing it to give the finger one poke.

Specular or mirror type reflection from obstacles cannot be depended upon to return light to the receiving lens because the angle of return of specular reflection depends on the angle that the reflecting surface makes with the beam from the light source. Unless the obstacle has a very shiny surface a small amount of light will be reflected from it in all directions as diffuse reflection. Regardless of the position or the angulation of the obstacle there will thus exist a pencil of rays that will run through the center of the receiver lens to form an image at a point in the image plane of the lens, as shown in FIG. 1. The location of the image with respect to the lens axis will be a measure of the distance to the obstacle.

In selecting lamps it was found that a xenon filled lamp provided the best response for the requirement. In order to eliminate light transients, such as reflections from passing automobiles, etc., it was decided to transmit the light in bursts. The smaller the ratio of on to off time, the smaller the probability that a transient will occur during "on" time. The glow discharge lamp proved to hold the final solution. Several types of lamps were tried including various types filled with inert gases which produce a glowing plasma of gas such as that in neon radio pilot lights. The radio pilot light, however, is not as successful in producing a high signal as the xenon filled lamps which proved to be richer in infrared radiation by about three times so that germanium photodiodes were about three times more sensitive to them. The gas pressure in the parallel electrode tube was on the order of 15 millimeters of mercury in order to take advantage of the relatively low voltage requirements without suffering from erratic behavior. Since it is desirable to get as much light as possible, the two limiting factors in deciding on lamp current are the life of the lamp and its maximum current practicality attainable as set by transformer weight and space limitations. The value decided on was 100 milliamps per pulse which provided a lamp life of between 10 and 50 hours. Type Xe 51 lamp proved highly successful.

The photodetectors are selected so that the small concentrated light spot produced by the xenon lamp is approximately the same size at the active area and so that the active areas extend as close as possible to the edge of the detector so detectors may be placed as close together as possible. Various types of photodiodes were studied and it was attempted to match the response to the spectrum of the xenon lamps obtaining a linear response over the wide range of light intensities. Tests showed that the size of the sensitive area should be kept as small as possible to reduce the signal to noise ratio. The size, however, should be at least as large as the circle of confusion of the Fresnel lens used. Both germanium and silicon photodiodes such as Texas Instrument type 1N2175 and Nucleonics Products Co., Inc. type TP 50 have been found satisfactory.

Fresnel lenses 11 and 16 are preferred to other types of lenses because of the inherent ability of such lenses to be made quite thin and still maintain a short focal length. The Fresnel lens also offers a low $f$ number or ratio of focal length to lens aperture for a given maximum acceptable circle of confusion. In one case the focal length of the lenses 2½″ x 3½″ was 3″, area was cut down to about 7 square inches, and focal length and the effective $f$ number was $f/1$. The separation of the centers of the lens was about 8 centimeters or about 3⅜″ so that this distance formed the base of the triangulation. Plastic was chosen over glass because of its lighter weight and lack of fragility as well as the ease of fabrication and higher infrared transmission per unit thickness. In addition to other types of lenses, reflectors also might be employed but would probably have to be of complex form to be satisfactory, besides which the casing would still have to be closed with plain glass or plastic.

Figure 6:
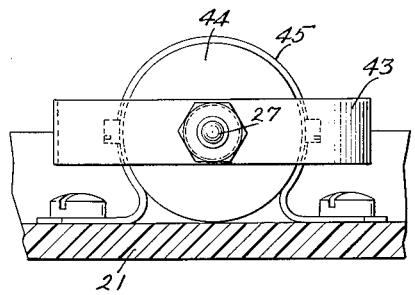
FIG. 6 is a view of the stimulator of FIG. 25 taken along line 6—6.

Referring to FIGS. 5 and 6 a preferred embodiment of the tactile stimulator of the present invention is shown in greater detail. As shown it consists of a polarized relay design in which an Alnico magnet plunger 40 slides within the recess of an annular bobbin 41 for coil 42. Since Alnico has a very low permeability, the structure has a low self-inductance, allowing the current to rise to its steady-state value very rapidly. The plastic bobbin 41 on which the coil 42 is wound is for the sake of its lubricating properties, advantageously made of nylon. The brass blunt poker 27 is threaded into plunger 40 and protrudes through a flat spring 43 whose ends are curled around and fixed, as shown, to the steel solenoid casing 44 which supports the bobbin and the coil. This construction restricts the travel of the plunger without introducing noise such as arises when fixed end stops are employed. The structure meets self-inductance limits on the rate at which current builds up in the coil to within the tolerances required for efficient response from the multivibrator drive. The whole structure is held in place by a suitable bracket 45 on shell 20b of casing 21. The pulse repetition rate was chosen so as to be as fast as necessary to assure not missing an obstacle, but, in order to conserve power, no faster. If the user walks at the rate of four miles an hour with a 30 inch step and scans a four foot wide path eight feet in front of him once per step and if the pulse repetition rate is 20 pulses per second, two pulses will be returned to him from a one foot wide object at eight feet or two pulses from a six inch wide object at four feet. Such performance proved satisfactory in the test model but higher repetition rates in the order of 40 to 50 pulses per second will be more certain to give satisfactory response under almost any conceivable practical circumstances.

Figure 7:
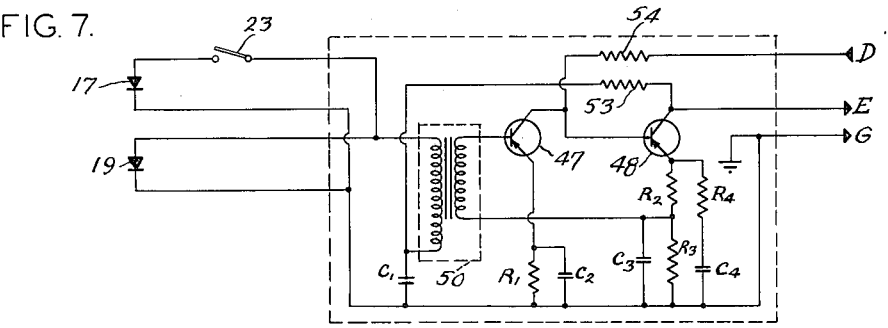
FIG. 7 is a circuit diagram of the first part of the light signal amplifier on the first circuit board in the handle of a dual range obstacle detector.
Figure 8:
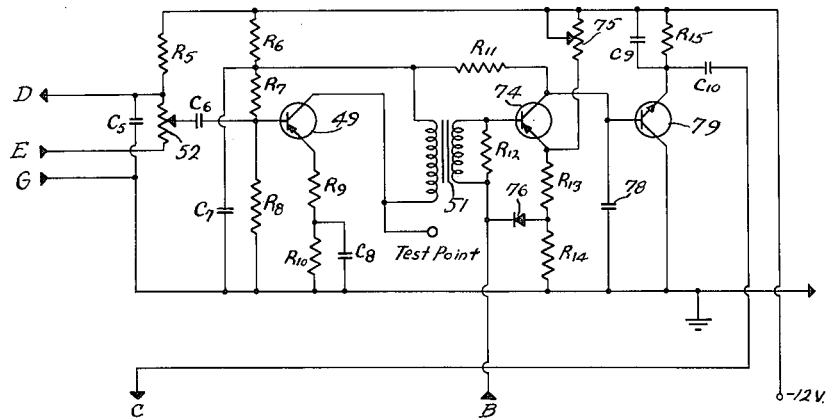
FIG. 8 is a circuit diagram showing the last stage of the light signal amplifier and the gate circuit of the obstacle detector.

The circuitry required to accomplish the desired results will now be considered. Referring to FIGS. 7 and 8 there is shown the light signal amplifier circuit which consists of transistors 47, 48 and 49, an input transformer 50 and an output transformer 51, a potentiometer 52 is provided for adjusting the gain. As can be seen in FIG. 7 the photodiodes 17 and 19 are in parallel across the primary input transformer 50 but the range switch 23 permits photodiode 17 to be selectively included or removed by closing or opening its circuit. The transistors are connected in a common emitter amplifier configuration. D.C. stabilization is achieved by the use of emitter resistors, suitably by-passed capacitively, and low frequency negative feedback from the emitter of transistor 48 to the secondary end of transformer 50 and from one end of potentiometer 52 back to the common connection between the collector of transistor 47 the base of transistor 48 through resistor 54. The circuit of FIG. 7 is on a circuit board designated 55 in the handle 21 of the casing as shown in FIG. 2. The circuit of FIG. 8 is located on a circuit board in the light source chamber 30 of the dual range obstacle detector in a location designated 56. In one device built and tested the maximum response of the amplifier comes at 3000 cycles per second and half power response comes at 1200 and 7400 cycles per second, respectively. The maximum voltage gain is 480 times.

The amplifier signal (an oscillogram of which is shown in FIG. 13c) is next added to the gate signal by means of step-down transformer 51. The gate signal originates in the circuit of FIG. 10 which is representative of the bottom circuit board 57 at the bottom of the casing of the obstacle detector (FIG. 2). This circuit contains the pulse generator and lamp drive circuit and the pulse generator circuit is in itself unique. The heart of this circuit lies in the transistors 59 and 60. Transistor 59 is a PNP type transistor whereas transistor 60 is an NPN type. They are coupled directly to each other, the collector of transistor 59 to the base of transistor 60 and collector of transistor 60 to the base of transistor 59. This arrangement would be the equivalent in vacuum tubes of plate to grid connection in each instance and is, in principle, a method of obtaining positive feedback in multivibrator pairs. However, the use of an PNP and NPN complementary pair makes possible the direct coupling and results in both transistors being in their highly conducting states at the same time in one part of the cycle and both being in less conducting state in the other part of the cycle. Operation of the circuit can be understood by reference to FIG. 10a which represents voltage time oscillograms. On this plot the solid line A represents the common potential on the base of transistor 59 and the collector of transistor 60, the gate signal at point A in FIG. 10. The dashed line B represents the potential at point B in FIG. 10 before the emitter of transistor 59. The dotted line C represents the potential at the collector of transistor 59 and base transistor 60, i.e., their common connection or point C in FIG. 10. The solid line D represents potential at the emitter of transistor 60, or point D in FIG. 10. In the semi-quiescent state between pulses the capacitor 61 is gradually discharging through the resistor 62. The rest of the circuit is quiescent. In this state transistor 59 is cut-off and transistor 60 is conducting. The bias voltage of transistor 60 is determined by voltage divider 63a and 63b. The bias voltage, in turn, determines the transistor 60 emitter voltage, and resistance 64 determines the emitter and collector currents. The load resistor 65 determines the emitter voltage of transistor 60 which is also the transistor 59 base voltage. A pulse is initiated when capacitor 61 discharges to the point where the emitter of transistor 59 is positive with respect to its base, at which point curve B rises above curve A. The current through transistor 59 causes a rise in the potential of the collector of transistor 60 and the base of transistor 59, which rise acts as positive feedback to further increase transistor 59 collector current. Within less than 10 microseconds the transistor 59 becomes saturated (curve A meets curve C) and the pulse has been initiated. During the pulse transistor 59 continues saturated while the capacitors 61 and 66 are charging. When, after 200 to 250 microseconds, their potentials come sufficiently close (curves B and D), the transistor currents can no longer be maintained and begin to decrease. Positive feedback speeds the decrease in current in both transistors. Curves A and C almost instantaneously return to near quiescent values, and the pulse is terminated. For a millisecond or less after the pulse, until capacitor 66 can discharge through resistor 64 (where the time constant of this RC circuit is 1.5 milliseconds) transistor 60 is cut-off. Curve D is above curve C. During this period curve A (the collector of transistor 60) is near zero volts. This develops a "back lash" (FIG. 13b) on the output pulse which later becomes the actual gating pulse (FIGS. 13d and 13f). About 46 milliseconds are required for capacitor 61 to discharge through resistor 62 (where the time constant of resistor 62 and capacitor 61 is 9 microseconds) in a repetition of the semi-quiescence of the first step of the sequence. The choice of pulse repetition rate will be discussed hereafter. The choice of pulse width results from the desire to make the pulse as narrow as possible to combat noise provided that the photodiodes have time to rise to their state of full response. The output pulse from the pulse generator is represented in FIG. 13a.

Also shown in FIG. 10 is the lamp drive circuit. A series of three emitter followers 68, 69 and 70 are driven by the pulse generator and produce current amplification. This is converted to high voltage to drive the lamp by the transformer 71 which is enclosed in a mu-metal shield to keep its field from affecting other parts of the circuit. As seen in FIG. 13c its output provides a lamp current for lamp 10 of 80 milliamperes for a quarter of a millisecond so that the average lamp current of a complete cycle is about 0.4 milliampere.

Figure 9:
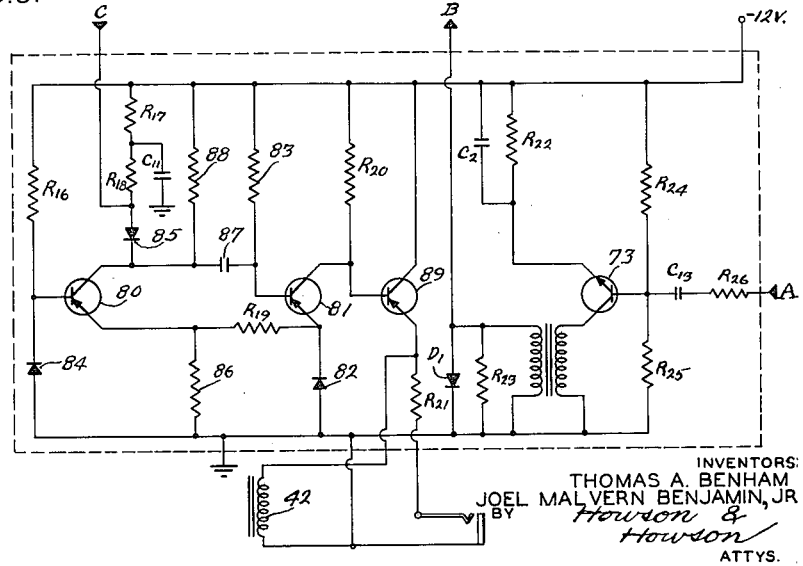
FIG. 9 is the stimulator drive cricuit of the obstacle detector.

The output from the pulse generator also goes through lead A to the gate signal amplifier shown in FIG. 9. This consists of an NPN transistor 73 and associated circuitry as shown in the right-hand portion of FIG. 9. Actually it is not the original signal, or the pulse from the original signal, but rather the back lash of the pulse from the original signal (see FIG. 13b which shows voltage at the collector of transistor 73). This signal is transformed to become the gate signal (seen in its final form in FIG. 13d), whereas the original signal itself is suppressed. This gives the required slight time delay for optical and electronic action. The output is fed through lead B to the circuit of FIG. 8.

The gate transistor 74 in FIG. 8 operates as follows: The transformer 51 adds a detected light signal directly onto the gate signal from the connection labeled B. The first back lash (the inverted signal immediately following the primary pulse, see FIG. 13e) of the light signal is larger than the light signal itself (except where it is clipped as in FIG. 13e) and is timed and phased correctly to add onto the gate signal extending its negative excursions when a light pulse is present. The resulting wave form is the solid curve of FIG. 13f and is the voltage applied to the base of transistor 74. The voltage of the emitter of transistor 74 is adjusted by the potentiometer 75. The quiescent value of the emitter voltage is sufficiently negative with respect to the zero biased base that even large light pulses cannot bring transistor 74 to conduction at any time between gate signals. When the gate signal enters, it causes the base of transistor 74 (as usually adjusted) to go negative with respect to the emitter. Diode 76 transmits some of the negative excursions of the gate signal to the emitter and thus sets limits to the resulting base to emitter voltage. FIG. 13f illustrates by alternative plots curves A, B and C what happens to the emitter voltage of transistor 74 with different adjustments of potentiometer 75. In the case of the adjustment as in the case of curve A the voltage on the base of transistor 74 becomes so much more negative than the emitter that both the signal and noise are passed through transistor 74. In the adjustment resulting in the case of curve C, the base never does become negative with respect to the emitter and the gate never really opens, even for large light pulses. In the case of curve B, the adjustment is such that the base goes negative with respect to the emitter if sufficiently large light pulses are present, but not if only pulses of the size of a noise fluctuation are present. This is obviously the desirable adjustment.

When the base of the transistor 74 does go negative with respect to the emitter, current flows out from the collector into capacitor 78 which serves to collect the total charge and thus integrate the pulse. The discharge of this condenser 78 slightly widens the resulting pulse which is fed to the NPN emitter follower 79.

The pulse from emitter follower 79 triggers the one-shot multivibrator shown in FIG. 9 through conductor C which in turn operates the stimulator 26 through its winding 42. The one-shot multivibrator will not act unless stimulated by a pulse coming through the gate of FIG. 8 and so triggered it produces a single rectangular pulse 9 milliseconds wide. Both of its transistors 80 and 81 are PNP type. The collector of transistor 80 is condenser and resistor coupled to the base of transistor 81. Transistor 81 is coupled to transistor 80 through their emitters. Reference is made to FIG. 14 which shows schematically what happens to each part of the circuit when a pulse is introduced.

As seen in FIG. 14, the action occurs in four stages as follows: Between pulses the circuit is quiescent. In this state the transistor 80 is cut-off; transistor 81 is conducting. Both emitter voltages, curve B, are determined by a stabistor 82 (e.g. with type SG 22, −0.6 volt for transistor 81; −0.5 volt for transistor 80). The base current of transistor 81, and therefore its collector current, is determined by the resistor 83. The base voltage of transistor 80 (curve C) is determined by stabistor 84 (e.g., type S320G at −0.2 volt). Action is initiated by a positive pulse on the collector of transistor 80 arriving through the diode 85 (e.g., type 1N58). This pulse drives the base of transistor 81 positive cutting down transistor 81 current. Consequently, both the emitter voltages rise toward zero volts. At −0.1 volt, the emitter of transistor 80 is enough positive with respect to its base to start transistor 80 conducting. The collector current of transistor 80 raises its collector voltage (curve E), adding positive feedback to the initiating pulse. The ultimate transistor 80 current and transistor 80 collector voltage is determined by the diode 84 on its base and the resistor 86 on its emitter. The 3 volt rise of the collector of transistor 80 drives the base of transistor 81 to more than two volts positive and cuts off transistor 81. The base voltage of transistor 81 then decreases (curve A) heading for −12 volts at a rate determined by the discharge of the capacitor 87 through the resistor 83 and the resistor 88 (together providing a time constant of 52 milliseconds). The voltage reaches minus 0.3 volt after 9 milliseconds. At this point transistor 81 becomes conducting and termination of the pulse is initiated. The current which begins to come through transistor 81 decreases the emitter voltage cutting down on the current through transistor 80. Positive feedback speeds return of transistor 80 to cut-off and transistor 81 to its quiescent condition. The collector voltage of transistor 81 (Curve D of FIG. 14) is taken as the output pulse. It is fed to the emitter follower 89 which drives the tactile stimulator through its coil 42.

The maximum average power consumed by the device of the present invention is 370 milliwatts of which about 36% goes to the lamp and its drive circuit and 30% to the stimulator. An independent measurement of the voltage across the lamp with the current through it shows the peak lamp power to be 13.8 watts with a new lamp.

The power supply battery and its associated circuitry are shown in FIG. 11. The battery 32 is by-passed by condenser 90 which helps supply the surges required by the glow lamp and the stimualtor. The battery is preferably a rechargeable 12 volt nickel-cadmium battery. A pair of 6 volt Burgess CD21 batteries is suitable for this purpose and fits the available space. These batteries are rated at 150 milliampere-hours. At a drain of 31 milliamperes, these would last for five hours of continuous use on a single charge. Nickel-cadmium type battery is preferred because it has high power-to-weight and power-to-volume ratios. It also has an essentially constant output voltage during most of its discharge time. It is not greatly affected by temperatures and is capable of great many charging cycles.

Also in parallel with the battery 32 is a chronistor 91 and limiting series resistor 92. The chronistor by a plating action tells the period of time over which the device has been used. A switch 93 is opened when the device is not in use. Preferably charging is accomplished in a storage case (not shown) for the obstacle detector unit. In this event, when the unit is placed in the storage case, the charger shown in FIG. 12 can be coupled to it. The charging circuit consists of a plug 94 capable of connection to any ordinary outlet of 115 volts A.C., a voltage reducing transformer 95 reduces the voltage level and isolates the circuits from the 115 volts to reduce shock hazard. A rectifier 96 and smoothing capacitor 97 together with a resistance network provides the required direct current. The charging time, as a practical matter, is about equal to the use time.

The following table lists values or types of components actually used in one embodiment of the circuits of FIGS. 7–12:

| Resistor: | Resistance in ohms |
|---|---|
| $R_1$ | 1,800 |
| $R_2$ | 1,000 |
| $R_3$ | 1,500 |
| $R_4$ | 220 |
| 53 | 22,000 |
| 54 | 22,000 |
| $R_5$ | 4,700 |
| $R_6$ | 22,000 |
| $R_7$ | 68,000 |
| $R_8$ | 22,000 |
| $R_9$ | 330 |
| $R_{10}$ | 1,800 |
| $R_{11}$ | 22,000 |
| $R_{12}$ | 10,000 |
| $R_{13}$ | 470 |
| $R_{14}$ | 1,000 |
| $R_{15}$ | 15,000 |
| 52 | 10,000 |
| 75 | 50,000 |
| $R_{16}$ | 27,000 |
| $R_{17}$ | 47,000 |
| $R_{18}$ | 22,000 |
| $R_{19}$ | 33 |
| $R_{20}$ | 4,700 |
| $R_{21}$ | 2,200 |
| $R_{22}$ | 10,000 |
| $R_{23}$ | 22,000 |
| $R_{24}$ | 22,000 |
| $R_{25}$ | 33,000 |
| $R_{26}$ | 10,000 |
| 88 | 22,000 |
| 86 | 220 |
| 83 | 82,000 |
| $R_{27}$ | 22,000 |
| $R_{28}$ | 4,700 |
| $R_{29}$ | 1,000 |
| $R_{30}$ | 10 |
| $R_{31}$ | 6,800 |
| $R_{32}$ | 1,500 |
| $63a$ | 39,000 |
| $63b$ | 470,000 |
| 62 | 375,000 |
| 64 | 1,500 |
| 65 | 2,700 |
| 92 | 3,600 |
| $R_{33}$ | 100 |
| $R_{34}$ | 360 |

| Capacitor: | Capacitance in microfarads |
|---|---|
| $C_1$ | 2.5 |
| $C_2$ | 1.0 |
| $C_3$ | 10.0 |
| $C_4$ | 1.0 |
| $C_5$ | 50.0 |
| $C_6$ | .1 |
| $C_7$ | 1.6 |
| $C_8$ | 1.0 |
| $C_9$ | .01 |
| $C_{10}$ | .25 |
| 78 | .0068 |
| $C_{11}$ | 1.0 |
| $C_{12}$ | .1 |
| $C_{13}$ | .5 |
| 87 | .5 |
| $C_{14}$ | .5 |
| 61 | .05 |
| 66 | 1.0 |
| 90 | 250.0 |
| 97 | 100.0 |

*Voltmeter readings at various points in the circuit*

(Readings taken with an 11 megohm vacuum tube voltmeter. All are referred to the positive side of the battery as zero. Circuit, including stimulator, is running. Values in parentheses are for the case that stimulator is not operating.)

| Transistor | Emitter, Volts | Base, Volts | Collector, Volts |
|---|---|---|---|
| 47 | −0.5 | −0.6 | −1.1 |
| 48 | −1.0 | −1.1 | −3.9 |
| 49 | −0.7 | −0.8 | −2.6 ($T_2$) |
| 74 | −0.9 | 0 | −3.7 |
| 79 | −3.5 | −3.7 | 0 |
| 80 | −0.4 (−0.5) | −0.2 (−0.2) | −9.6 (−11.0) |
| 81 | −0.4 (−0.6) | −0.3 (−0.8) | −2.8 (−1.0) |
| 89 | −2.7 (0) | −2.8 (−1.0) | −11.3 ($T_1$) |
| 73 | −6.6 | −6.5 | −0.4 |
| 59 | (¹) | −1.5 | −10.2 |
| 60 | −10.3 | −10.2 | −1.5 |
| 68 | −0.07 | +0.12 | −11.3 ($T_1$) |
| 69 | −0.06 | −0.07 | −11.3 ($T_1$) |
| 70 | −0.09 | −0.06 | −11.3 |

¹ Do not measure.

91 Chronistor, Bottom (Negative) Terminal: −0.9 v.
17, 19 Photodiodes (Red Spot): −3.2 v.

| Diodes: | Types |
|---|---|
| 17 | TP50 |
| 19 | TP50 |
| 76 | T–3 |
| 84 | S3206 |
| 85 | IN58 |
| 82 | S622 |
| $D_1$ | IN34 |
| $D_2$ | IN202 |
| $D_3$ | IN34 |
| $D_4$ | S622 |
| 96 | IN91 |

It is possible to provide an obstacle detector with more than two ranges by adding additional photopickups similar to the diodes 17 and 19. However, the addition of additional detectors further complicates the situation to such a degree that it is usually considered desirable to provide separate stimulators actuated by separate amplifying channels from each of the photodiodes. In a way, such a system is more straightforward than the system described. Yet, in another way, it is more complex and requires duplication of equipment including multiple tactile stimulators, one for each range. These may be arranged, for example, along the gripping handle of the device shown in FIG. 2 such that the near range stimulates the ring finger, the middle range stimulates the middle finger, and the far range stimulates the index finger. Such a device was actually built having ranges which centered about distances three, five and seven feet, respectively, from the user. Use of the three range stimulator requires considerable concentration and more than three ranges is considered too difficult for the ordinary person to master and use comfortably.

Referring to FIGS. 15a and 15b it will be observed that the same type of target in the different ranges may produce a different response if as in FIG. 15a the target is a dark object or one having poor reflection properties. A good target, however, produces very little difference in response characteristic from the standpoint of actuating a stimulator, as can be seen from FIG. 15b. The dashed line curves in these two figures illustrate how the characteristics at a particular range may be improved for poor targets by the use of a so-called "integration" technique, but not appreciably improved for good targets. The integration technique was applied only to the middle and far ranges since it was not necessary in the near range.

The avowed purpose of the integrating circuitry was to increase the signal to noise ratio, and hence the sensitivity, in the middle and far ranges. The integrating circuitry took the form of an integrating condenser charged through a diode-resistor combination so that the potential across the condenser would be raised by the application of successive pulses. The condenser is isolated from the multivibrator input by a diode in the part of the circuit which follows it. This diode is biased "off" by the battery supply voltage. Current arriving at the condenser thus cannot pass on to the multivibrator unless sufficient voltage has been previously developed across the condenser to bring the diode near its threshold of conduction. A stage of grounded collector current gain couples the integrating network back to the output of the gating stage in order that the network may be designed with components of reasonable size. The circuitry for the middle range is adjusted to pass a signal on the second incoming pulse. The far range circuitry is adjusted to require three pulses. High resistance applied directly across the integrating condensers drains off the condenser charge fast enough that a pulse will not be passed on to either multivibrator if the proceeding pulse has been missed.

Considering now the problem of curb detection, FIGS. 16a, 16b and 16c illustrate in very simple schematic diagrams the way in which the curb detector works in situations of down-curb, up-curb and down-slope. Again it will be observed that the device is a triangulation device employing light within the visible, or near visible, spectrum. In order to accomplish the purpose of curb detection the light must be directed downwardly, and thus, if the light is generated by a light source 100 and focused into a narrow beam by lens 101, it will follow a path 102. Assuming that the ground is level, it will strike the level ground 103 and be reflected back in nonspecular reflection along path 104 through lens 105 to photopickup 106. The device is capable of operation in either of two ways. As shown in FIG. 16a in the case of down-steps exceeding a minimum height the light beam 102 will be extended along path 107 to the lower level 108. If the step is a vertical or steep discontinuity 109, the spot 110 may actually be hidden from the photodetector 106 along the direct line path 111. In such case the system is designed to give a signal.

If, on the other hand, as shown in FIG. 16b an up-curb 112, or up-grade, is encountered, the light path 102 will be foreshortened at the spot 113, from which light is reflected back to photodetector 106 along path 114. If the light beam 102 is kept extremely small, the sudden movement of the spot 113 away from alignment with the spot it would have occupied had the ground remained level will cause a change in the position at which the pick up must be located in order to receive the reflection. In preferred embodiments of the present invention a servo motor is provided to cause the pick-up to follow, or attempt to follow, the reflected beam 114. A signal would occur under these circumstances if the beam 114 or its light spot 113 were lost due to the inability of the servo to follow it or due to the necessity for the servo system to exceed a certain velocity in following the beam.

FIG. 16c illustrates the related problem of uniform down slope 116. In a sense, the problem is more closely related to the up-curb of FIG. 16b than the down-curb of FIG. 16a since as the beam 117 strikes a spot 118 on downslope 116 which can be seen by the pickup along path 119, the detector will tend to be moved by the servo to follow it, but may not be able to do so sufficiently rapidly and a signal will result. It will be obvious that when an upslope is encountered the same type of situation is involved but the spot will seem to move in the opposite direction from its level ground position.

Figure 17:
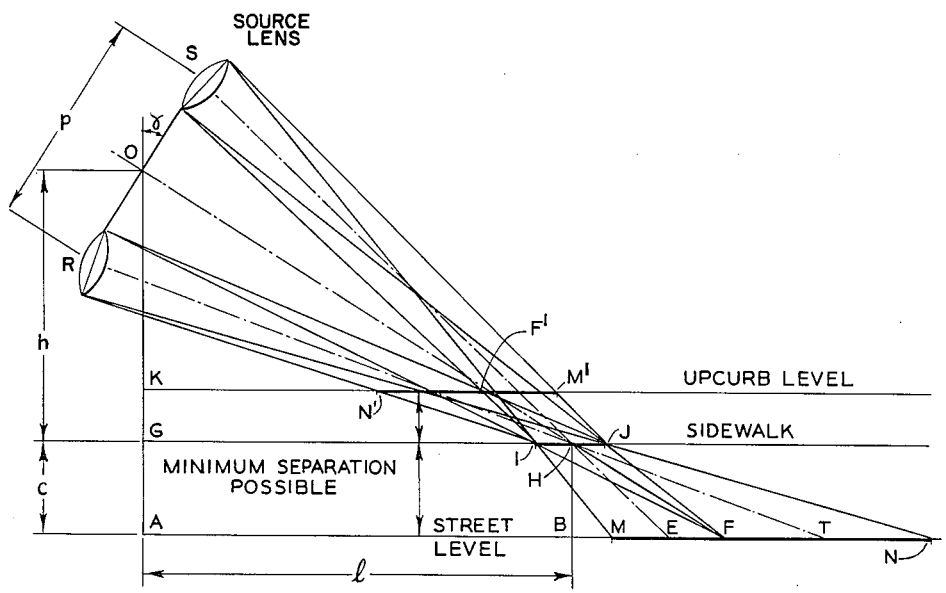
FIG. 17 is a composite schematic diagram showing the optics of the curb detector.

FIG. 17 shows the basic elements of the triangulation system used for ranging. O is the center of the device and G is the vertical projection of this point on the ground. GH is the sidewalk, AN the street. OF is the centerline of the device, while SH and RH are the centerline of the source lens and receiver lens whose centers S and R are spaced equi-distant from O and are separated by a distance $p$. The instrument is inclined to the vertical by the angle $\gamma$. The distance from the center of the device to the surface on which the user is standing is designated $h$, while the minimum detectable drop below this surface is called $c$.

The source lens, S, will project a spot of light of width $IJ=s$ whose approximate center, H, is a distance $l$ measured along the sidewalk from G. The receiving diode is adjusted to receive light from IJ and nothing more. It will be seen from the drawing that if the target now drops to the street level AN, the source will center at E, while the receiver images a space that centers at T.

If the lens apertures are sufficiently small, the two object spaces centering at E and T will not overlap. For any spot diameter, $s$, and any particular set of values of $h$, $l$ and $c$, there will exist a maximum lens aperture, $a$, and a minimum lens spacing, $p_{min}$, such that the extreme light rays IF and JF will just intersect on the street. Under these conditions, KN' is the line level above the sidewalk at which the two spaces will also just miss overlapping. KN' thus represents the level above which an upstep may be detected. Since it will always be less than $c$, it need not be calculated.

The range limitations are, of course, different from those of the obstacle detector. The warning distance has been selected in test devices assuming that it is necessary that the user be allowed at least one step after the warning of a break to react to the warning, shift his weight and decide how to alter his course. On the basis of the average step length of six male adults tested, a range of 24 to 30 inches per step during normal walking is required. In order to give sufficient warning the minimum detection distance should be 48 to 60 inches. A shorter range might be desirable in certain instances, such as where the device is being used statically at the top of a flight of stairs or on a train platform. It is possible to incidentally provide a nearer range detector in addition to the far range detector, but for the purpose of discussion hereafter it will be assumed that the minimum distance will be 48 inches. The maximum range might be five feet to seven and a half feet, if the minimum range is four feet to six feet allowing for natural swing to produce variation in hand position as the user walks.

In designing a system various factors have to be taken into consideration, such as the problems of spot size and pick-up size, lens separation, image shift for small range, effect of tilt on range detection, effect of slope on range detection, etc.

Considering first the problem of ranging, it is desirable that the source or spot be kept as small as possible and that the receiving photosensitive member, preferably a photodiode, be arranged to receive light the size of the spot and nothing more. If the size of the light spot is not the size of the diode, it is possible to detect motion of the light spot such as occurs when the level of the street changes. However, if the light spot is less than the diameter of the diode, it is difficult to distinguish such motion from changes in apparent size and shape of the spot caused by changing target surfaces. For example, when part of the spot covers a poorly reflecting surface and another part a good reflection, this cannot be detected from a shift if the light size spot is smaller than the photodiode. Because of this possibility of confusion even when the light spot and the photodiode are the same width the criterion for detectability has been made that all parts of the spot be completely removed from the comparison area of the photodiode. As a practical matter, as will be explained hereafter, a pair of photodiodes are used in order to obtain a servoing effect.

The question of minimum lens separation can be calculated by a geometrical construction and such calculation indicates that the minimum lens separation is almost directly proportional to the spot diameter in the range concerned. The lens separation is large enough that the lens aperture may be made any convenient value without appreciably increasing the lens separation. The minimum lens separation is almost directly proportional to the height of the center of the instrument. The minimum lens separation is greatest at the closest distance so that, in effect, closest distance is the only distance for which it must be computed.

Similarly, the ranging sensitivity is almost directly proportional to the lens separation, is proportional to the curb height, is inversely proportional to range, and is almost inversely proportional to height of the instrument.

Study has indicated that attempts at holding the curb detector steady lend variations amounting to an arc of approximating nine degrees. If instead of consciously trying to hold the device horizontal, it were carried naturally the average angular variation within a pace for a limited number of people was found to be twenty-five degrees. It was concluded that a reasonable amount of control would keep the instrument steady to within plus or minus eight degrees.

While various types of systems have been suggested, probably the one most likely to be successful from a practical standpoint is that employing a single light source and a pick-up employing one or two photodiodes moved by a servo motor to follow movements of the light spot.

Figure 18:
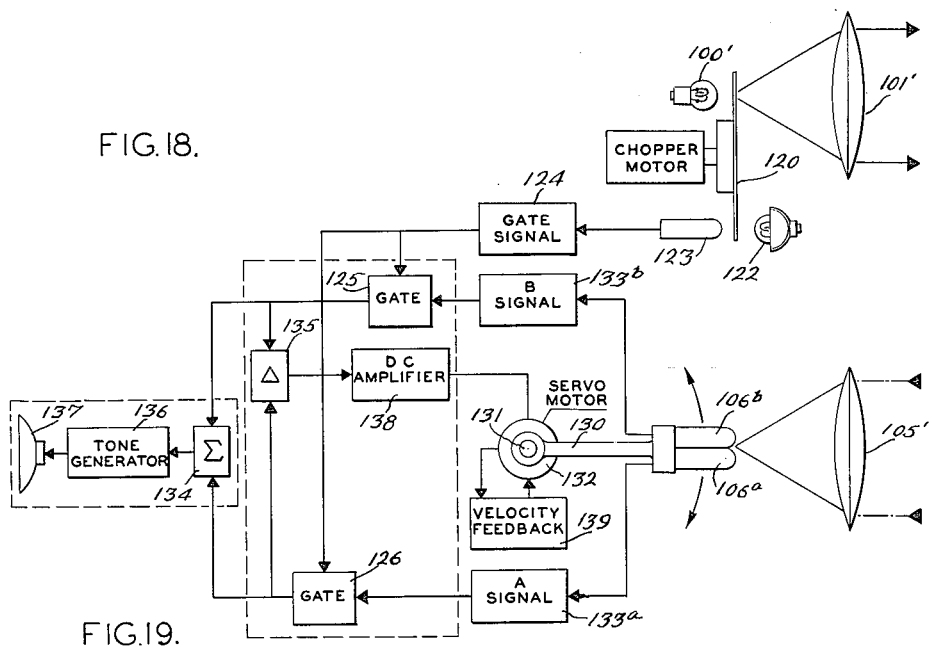
FIG. 18 is a block diagram showing schematically the operation of a preferred curb detector.

FIG. 18 is a block diagram of the curb detector. The main beam forming lamp 100′ is a miniature incandescent lamp with a coil filament covering an area of approximately one-half by one millimeter. The light beam from lamp 100′ is interrupted by a chopping disc 120 driven by motor 121 at the rate of 1200 cycles per second. The light and dark portions of each cycle are of equal length and the pulses of light are roughly rectangular in wave form. The lens 101′ is preferably a Fresnel lens of four inch diameter and three inch focal length. In the portable device, as ordinarily carried, this beam leaves the lens about thirty inches above the ground and about 10 inches in front of the hand. It hits the ground on the average of about five feet in front of the hand. The spot on the ground is one-half inch to three quarter inches in diameter.

Light from an auxiliary lamp 122 is chopped by the same chopping disc 120 and then enters a photocell 123, the output of which becomes the gate signal fed through amplifier 124 and driving gates 125 and 126. The receiving lens 105′ is identical with the source lens 101′ and mounted about fifteen inches below said lens. It picks up light scattered from the target and focuses it on a pair of photocells 106a and 106b. These photocells are mounted by suitable support and connection means 130 on the armature 131 of servo-motor 132 which is driven and moves in such a manner as to follow variations in position of the light spot. As shown, the range limits between these coils are such that the device is able to track the spot from 40 to 87 inches measured from source lens to target. The tracking is accomplished by noting any insensity difference between responses of the two photocells and feeding the servo-motor a signal which will cause it to move to such a direction as to decrease the difference. The signals from the photocells are amplified in separate channels "A" and "B" by amplifiers 133a and 133b and fed, respectively, to gates 126 and 125. The gates are synchronized by the chopped signal from light source 122 and chopper disc 120 so as to discriminate against any signal which does not have the frequency and phase of the pulse in the instrument's own beam. The outputs from the gates are fed to sum and difference circuits 134 and 135. Circuit 134 forms the sum of the two signals by effectively suitable speaker 137, whereas the difference network 135 forms the difference of the two signals by effectively subtracting the signals from the same gates. The sum signal is fed from network 134 through tone generator 136 to a suitable speaker 137, whereas the difference network 135 feeds D.C. amplifier 138 which applies the drive signal to the servo-motor 132 so that it will track the light spot by moving in such direction as to keep equal the signals at photodiodes 106a and 106b.

In connection with the servo-motor, an amplifier 139 labeled "velocity feedback" is provided. A magnet mounted on the servo-motor armature induces a voltage in stationary pickup coils whenever the armature moves. This voltage is proportional to the angular velocity of the armature. The velocity feedback amplifier amplifies this voltage and applies a signal to the servo-motor which opposes increase in velocity. It is important in preventing oscillations of the servo-motor and allows adjustment of maximum rate at which the servo can follow rapid changes in positions of light spot such as might be produced by encounter with a curb.

The sum signal fed to a tone generator 136 causes response only when the sum of the two light signals falls below a value which may be fixed by a potentiometer setting. Whenever the sum falls below this value, in other words whenever the photocells lose the light spot, the circuit responds by emitting a squeal through a minature speaker 137. It is desirable to present information in such form that it will not fatigue the user. For testing purposes, an audible signal produced by the speaker was used. The tactile stimulator type device was considered but not actually used, but could be easily substituted. In commercial arrangement it is possible that some other type of stimulator may be substituted in order to achieve the end of combination of obstacle and curb detectors into a single device which provides maximum effectiveness of response.

Figure 19:
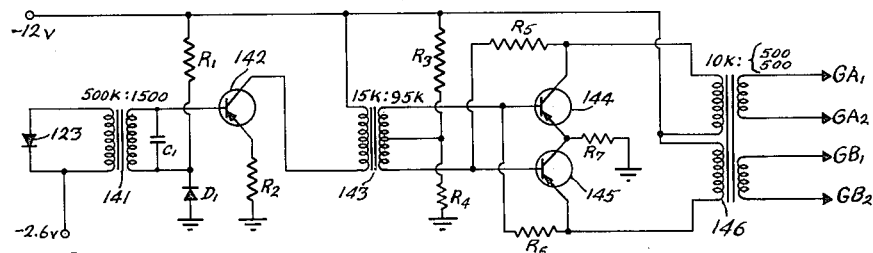
FIG. 19 is a circuit diagram of the gate signal amplifier of the curb detector.
Figure 20:
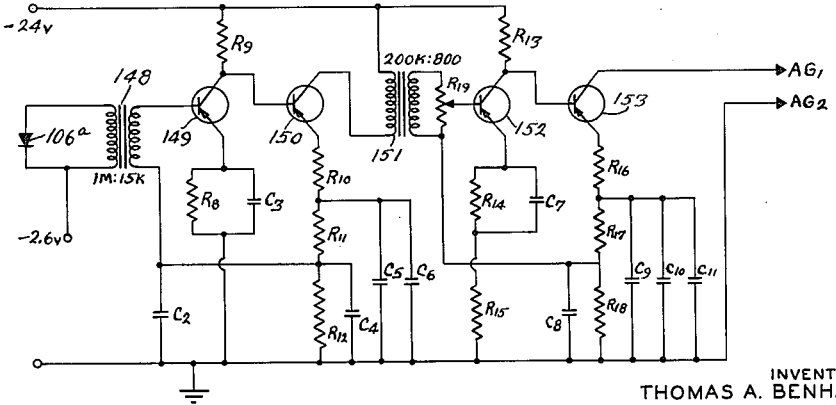
FIG. 20 is a circuit diagram of the A signal amplifier of the curb detector.
Figure 21:
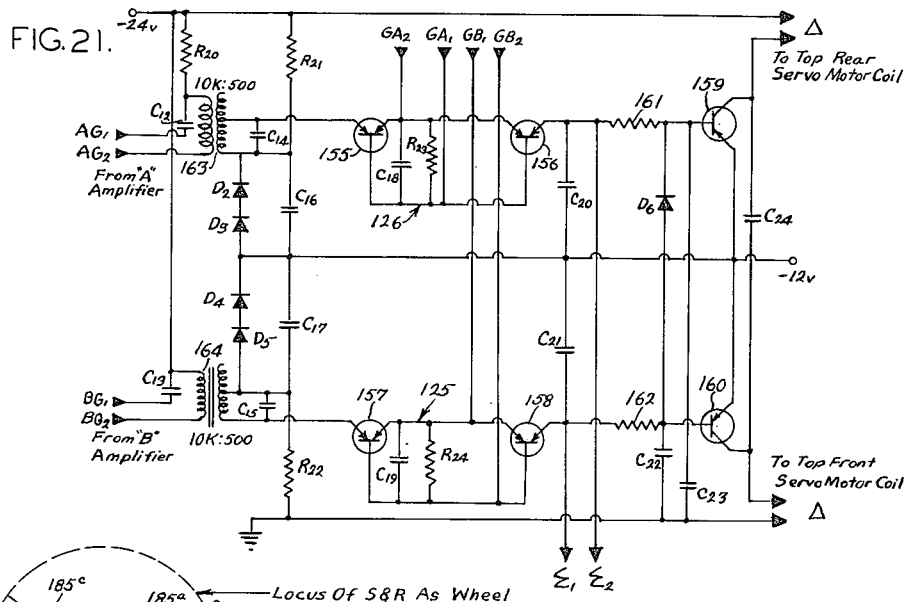
FIG. 21 is a circuit diagram of the D.C. amplifier of the curb detector.
Figure 22:
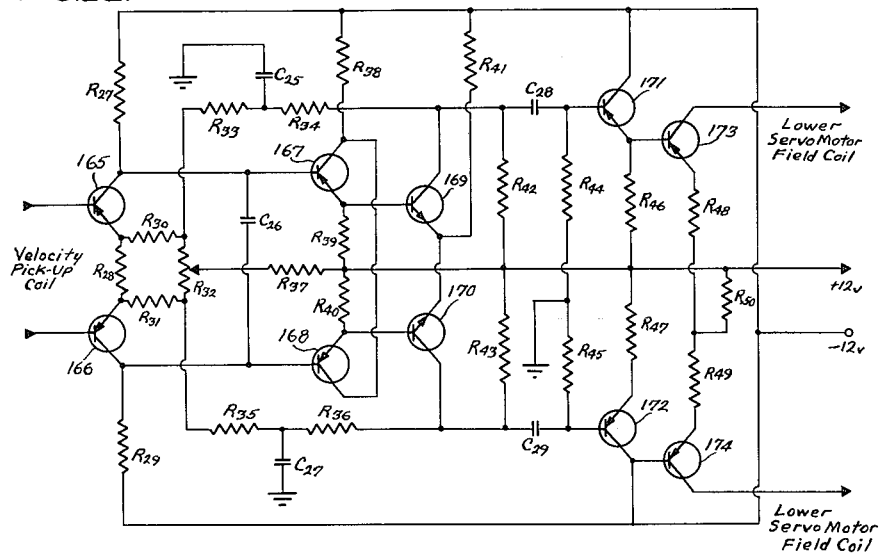
FIG. 22 is a circuit diagram of the velocity feedback circuit of the curb detector.
Figure 23:
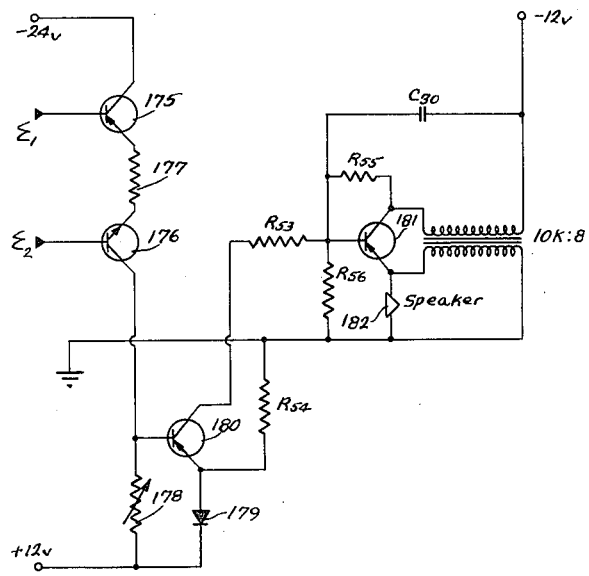
FIG. 23 is a circuit diagram of the tone generator of the curb detector.

FIGS. 19–23 give details about actual circuits in the system of FIG. 18. FIG. 19 is the gate signal amplifier. FIG. 20 shows the "A" (or "B") signal amplifier. FIG. 21 shows the two gates, the sum and difference circuits and the D.C. amplifier. FIG. 22 shows the velocity feedback circuit. FIG. 23 shows the tone generator circuit.

The gate signal amplifier of FIG. 19 consists of two stages of amplification from the photodiode 123 coupled by transformer 141. The first stage employs transistor 142 in common emitter arrangement which is coupled by transformer 143 to push pull arranged transistors 144 and 145 in the second stage. The separate outputs to gates 125 and 126 is achieved by means of a transformer 146 having a center tapped primary, the center tap of which feeds the inputs of each of the amplifier stages.

The light signal amplifier of FIG. 20 takes its input from one of the photodiodes, here photodiode 106a, and feeds the first of two like amplifier stages through input transformer 148. In the first stage are a pair of transistors 149 and 150 connected collector to base. This first stage is coupled through transformer 151 to the second stage including transistors 152 and 153.

The outputs of both the circuits of FIGS. 19 and 20 are combined in conventional gate circuits shown in FIG. 21. Transistors 155 and 156 provide the A signal gate 126 and transistors 157 and 158 the B signal gate. If the gate and the appropriate A or B signals coincide, an output from each of the gates 126 and 125 which experience the signal coincidence is fed to sum and difference circuits for adding them or taking their difference as described above. In addition the circuit of FIG. 21 provides a D.C. amplifier. The sum signal is derived as shown on the diagram by taking leads from the outputs of both gates for use in FIG. 23. The difference signal consists of the currents fed to the bases of transistors 159 and 160. If the difference signal is positive, 160 conducts and 159 is cut off. The opposite is true if the difference signal is negative. To understand these circuits in more detail, not that the signal in Channel "B" is reversed twice at transformers with respect to the signal in Channel "A." Thus at the entrance to the gates the two signals are in phase. The two gates open and close 180° out of phase with respect to each other. Thus, light on the "A" photodiode 106a produces a positive D.C. voltage output from the "A" gate 126. Light on the "B" photodiode 106b produces a positive D.C. voltage output from the "B" gate 125. Since these two voltages are opposed, the sum-signal actually consists of the difference between the two voltages and the difference-signal consists of the sum of the currents derived from the two voltages through the resistors 161 and 162.

The gates themselves operate as follows: transistors 155 and 156 constitute the "A" gate 126 while the "B" gate 125 consists of transistors 157 and 158. These four transistors are bilateral PNP devices. Either terminal other than the base can serve as emitter or collector. Corresponding junctions of the two transistors in each gate are connected together and to a secondary winding of the gate-signal amplifier output transformer 146. During one condition of the gate cycle these junctions are forward biased by the gate signal and both transistors conduct freely all the way through the gate. During the other condition of the gate cycle these junctions are reverse biased by the gate signal and at least one or the other of the transistors will be non-conducting. During the conducting part of the cycle any current entering the gate from the light signal amplifier through transformers 163, 164 must leave the gate at its output as the two gates are connected to separate secondaries on the gate signal output transformer, and these have no conducting connection to any other part of the circuit.

FIG. 22 shows the velocity feedback circuit. This is a multistage balanced amplifier employing transistors 165, 166, 167, 168, 169, 170, 171, 172, 173 and 174 in a straightforward amplifier circuit. The circuit input is connected to a velocity pick-up coil mounted to be cut by flux from a permanent magnet on the rotating shaft of the servo motor. This is fed back to a field coil of the servomotor and exercises a damping effect upon it. The circuit provides accuracy control of the feedback damping effect.

FIG. 23 shows the tone generator. Transistors 175 and 176 are a PNP-NPN complementary pair of transistors, connected as emitter followers in series with a common emitter resistor 177. The sum input signals are fed to the bases of these transistors and affect their conductivity. This resistor 177 is driven to span the difference between the D.C. voltages from the sum inputs from the "A" and "B" gates 125 and 126. The current through it is proportional to their difference and therefore produces a voltage across the potentiometer 178 proportional to the sum of these "sum" signals. The latter voltage is compared with that across a Zener diode 179 by transistor 180.

As long as either or both of the photodiodes are receiving a sufficient amount of light signal, transistor 180 will remain conducting and will send enough current to the tone generator oscillator including transistor 181 to bias it to cutoff. When, however, the photodiodes lose the beam, transistor 180 is cut off and the oscillator is free to produce a squeal in the speaker 182. Alternatively a tactile stimulator and suitable drive may be substituted.

The following tables list values or types of components actually used in one embodiment of the circuits of FIGS. 19–23:

| Resistor: | Resistance in ohms |
|---|---|
| $R_1$ | — |
| $R_2$ | 10 |
| $R_3$ | 10,000 |
| $R_4$ | 10,000 |
| $R_5$ | 82,000 |
| $R_6$ | 82,000 |
| $R_7$ | 2,000 |
| $R_8$ | 3,300 |
| $R_9$ | 68,000 |
| $R_{10}$ | 470 |
| $R_{11}$ | 3,900 |
| $R_{12}$ | 2,200 |
| $R_{13}$ | 56,000 |
| $R_{14}$ | 2,700 |
| $R_{15}$ | 100 |
| $R_{16}$ | 470 |

| Resistor—Continued | Resistance in ohms |
|---|---|
| $R_{17}$ | 1,800 |
| $R_{18}$ | 1,000 |
| $R_{19}$ | 5,000 |
| $R_{20}$ | 1,000 |
| $R_{21}$ | 6,800 |
| $R_{22}$ | 6,800 |
| $R_{23}$ | 500 |
| $R_{24}$ | 500 |
| 161 | 1,000 |
| 162 | 1,000 |
| $R_{27}$ | 18,000 |
| $R_{28}$ | 330 |
| $R_{29}$ | 18,000 |
| $R_{30}$ | 470 |
| $R_{31}$ | 470 |
| $R_{32}$ | 100 |
| $R_{33}$ | 160,000 |
| $R_{34}$ | 160,000 |
| $R_{35}$ | 160,000 |
| $R_{36}$ | 160,000 |
| $R_{37}$ | 10,000 |
| $R_{38}$ | 10,000 |
| $R_{39}$ | 33,000 |
| $R_{40}$ | 33,000 |
| $R_{41}$ | 12,000 |
| $R_{42}$ | 30,000 |
| $R_{43}$ | 30,000 |
| $R_{44}$ | 68,000 |
| $R_{45}$ | 68,000 |
| $R_{46}$ | 15,000 |
| $R_{47}$ | 15,000 |
| $R_{48}$ | 200 |
| $R_{49}$ | 200 |
| $R_{50}$ | 270 |
| 177 | 2,200 |
| 178 | 30,000 |
| $R_{53}$ | 10,000 |
| $R_{54}$ | 6,800 |
| $R_{55}$ | 220,000 |
| $R_{56}$ | 2,200 |

| Capacitor: | Capacitance in microfarads |
|---|---|
| $C_1$ | .1 |
| $C_2$ | 1.0 |
| $C_3$ | 2.0 |
| $C_4$ | 1.0 |
| $C_5$ | 25.0 |
| $C_6$ | 2.0 |
| $C_7$ | 3.0 |
| $C_8$ | 10.0 |
| $C_9$ | 10.0 |
| $C_{10}$ | 10.0 |
| $C_{11}$ | 2.0 |
| $C_{12}$ | 20.0 |
| $C_{13}$ | 20.0 |
| $C_{14}$ | .1 |
| $C_{15}$ | .1 |
| $C_{16}$ | 300.0 |
| $C_{17}$ | 300.0 |
| $C_{18}$ | .1 |
| $C_{19}$ | .1 |
| $C_{20}$ | 3.5 |
| $C_{21}$ | 3.5 |
| $C_{22}$ | 10.0 |
| $C_{23}$ | 10.0 |
| $C_{24}$ | 25.0 |
| $C_{25}$ | 8.0 |
| $C_{26}$ | .1 |
| $C_{27}$ | 8.0 |
| $C_{28}$ | 16.0 |
| $C_{29}$ | 16.0 |
| $C_{30}$ | .05 |

| Diode: | Type |
|---|---|
| 123 | TP50 |
| $D_1$ | S320G |
| 106a, 106b | TP50 |
| $D_2$ | S320G |
| $D_3$ | S320G |
| $D_4$ | S320G |
| $D_5$ | S320G |
| $D_6$ | S320G |
| 179 | [1] 651C4 |

| Transistor: | Type |
|---|---|
| 142 | 2N368 |
| 144 | 2N369 |
| 145 | 2N368 |
| 149 | 2N369 |
| 150 | 2N369 |
| 152 | 301 |
| 153 | 302 |
| 155 | 2N462 |
| 156 | 2N462 |
| 157 | 2N462 |
| 158 | 2N462 |
| 159 | 2N428 |
| 160 | 2N385 |
| 165 | 2N345 |
| 166 | 2N345 |
| 167 | 2N345 |
| 168 | 2N345 |
| 169 | 2N365 |
| 170 | 2N365 |
| 171 | 2N369 |
| 172 | 2N369 |
| 173 | 2N188A |
| 174 | 2N188A |
| 175 | 2N369 |
| 176 | 2N35 |
| 180 | 302 |
| 181 | 301 |

[1] (4.9 v. Zener.)

Two other parts to the circuitry may be added as desired. One is an up-curb signal generator. This functions to monitor the signal in the velocity feedback circuit and report, by means of some appropriate warning device, any excess of the servo velocity above some threshold value. The device described has limitations to its effectiveness in determination of up-curbs. It easily detects up-curbs of 6″ or more as a result of limitations on the tracking range and from sluggishness of servo-response introduced by the velocity feedback. However, in order to achieve finer results a separate up-curb generator producing its own separate signal may be desirable, if only to better distinguish the various discontinuities from one another.

The other part which might be added is a circuit to help the servo-motor scan its range to reclaim the light spot after it has been lost. The described device manages fairly well without this by having the balance of the servo armature adjusted so that gravity causes the photodiode to fall to the near range limit position when the beam is lost. At this point, the beam can be picked up again simply by tilting the device forward until the light spot comes close enough to register on the photocells.

Figure 24:
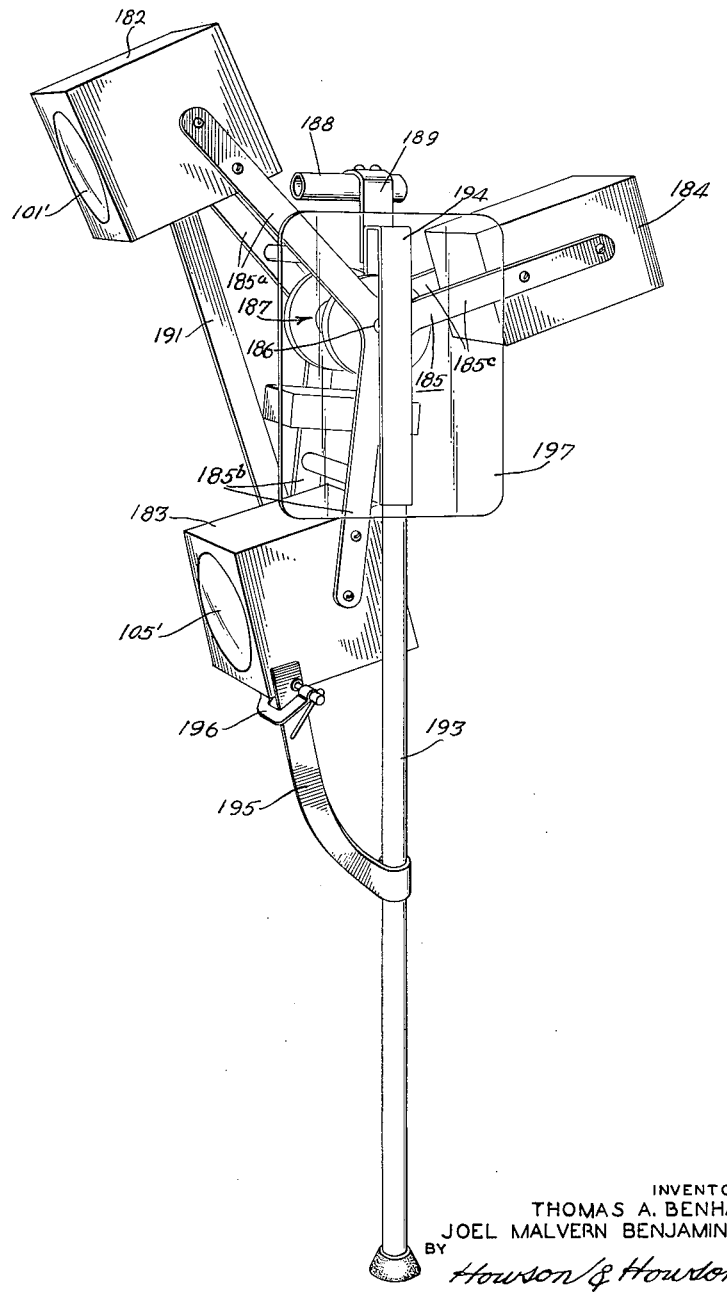
FIG. 24 is a diagrammatic view of an embodiment of the curb detector.

FIG. 24 illustrates in perspective the form which the actual model of the curb detector device assumed. It will be seen that there are three enclosures or boxes 182, 183 and 184 mounted at the ends of arms 185a, 185b and 185c of the double three-armed frame structure 185. This three-armed structure has its arms equally spaced from one another at 120° to provide a dynamic balance and is totally supported on pin 186 to rotate freely about a handle support structure 187. The actual handle 188 is connected to the support structure 187 by vertical extending member 189. Bar 191 rigidly fixed the position of box 182 relative to box 183. An auxiliary cane attachment 193 is attached to the handle of the support structure 187 by bracket means 194. Free rotation movement of the device relative to the handle can be prevented by connection between cane 193 and box 183 of a strip 195 permanently fixed to the cane and attached when desired by a C clamp 196 to the box. Also affixed to the bracket 194 is a clothes shield 197 of transparent plastic intended to keep the clothes of the user free of the rotatable structure. It will be apparent that the box or housing 182 carries the lamp 100′, the chopper motor and auxiliary lamp 122 and pickup 123 as well as lens 101′. Housing 183 carries photopickups 106a, 106b and the servo-motor 132 and its system behind plastic lens 105′. Box 184′ is reserved for the rest of the electronic components. Without the cane attachment, the device weighs 9¼ pounds. Of this weight, the batteries make up 28%. Its dimensions are about 22″ x 22″ x 5″ without. The auxiliary cane and clothes shield add another 1⅓ pounds and make the overall height 34″.

This device was carried both swinging freely on its ball bearings and fixed in position. When freely swinging it has a period of about ten seconds. The purpose of the ball bearing is to convert the rapid excursions of the user's hand in natural walking movement to slow motions of the device itself; thus, the consequences of rapid and large changes in position may be avoided. As a practical matter, it was found that with the rotating frame clamped to the cane the results were almost as good as when the device swung freely. Calculations indicated, however, that a freely swinging device should be more highly accurate particularly in critical areas such as the detection of up-curves. The purpose of the addition of the optional cane is (1) to provide a fore-and-aft handle in place of the sideways oriented bearing that must be grasped otherwise; (2) to keep the side of the body and one's clothing from interfering with the swing of the device; (3) to provide a leg on which the device can be rested when one is standing and not moving; and (4) to make it possible to clamp the device to the handle so that it will not swing freely.

Figure 25:
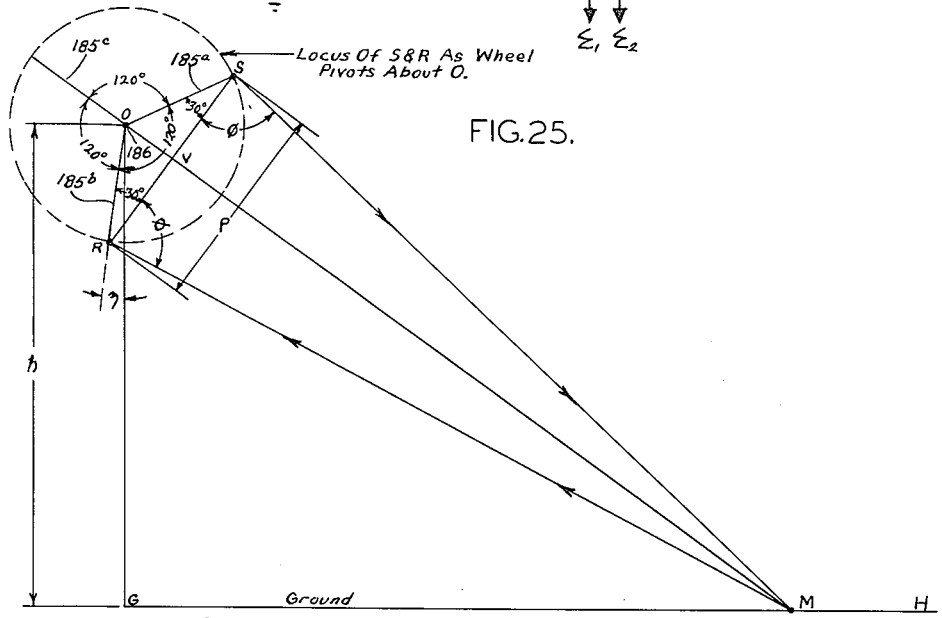
FIG. 25 is a diagrammatic view showing the dynamic operation and optical triangulation of the curb detector of FIG. 24.

FIG. 25 illustrates geometrically the device of FIG. 24 in the environment of its use. The frame 185 with its arms 185a, 185b and 185c provides the point of rotation O at its pin 186. Frame 185 also provides at points S and R the respective lenses 101′ and 105′. These lenses are arranged so that the distance between their centers $p$ is preferably on the order of 16 inches. If M designates the position of the light spot on the ground when the device is at rest, the device is designed so that M will fall on the perpendicular bisector to the ground for an average range. Since this point is determined by a slight unbalance of the massive pendulum 185 about its axis of rotation O, the light will oscillate about this point when the system is disturbed. When the light strikes the ground at M the angles $\phi$ and $\theta$ are equal. The wheel oscillates about O which is at a height $h$ of 30 inches above the ground. The angle of rotation may be described as $\eta$ the angle of rotation between the lower spoke 185b and the vertical. With the geometry as the pendulum rotates so that the light strikes the ground at some other point H, $\theta$ can be calculated since $\phi$ is fixed. The velocity of the spot of light along the ground determines how rapidly the received light angle varies.

Various embodiments of devices have been conceived. Simple devices eliminating the stabilizing platform are shown respectively in FIGS. 26-33 and 34. The structure of FIGS. 26-33 is of modified cane-like form and hence more conventional to the blind user. It is designed to house essentially the same structure as the device of FIG. 24 but in a vertical array. The main body of the cane structure 200 is hollowed out to provide suitable compartments, the lowest of these seen in the section of FIG. 32 contains a battery 201 located as low as possible to make its pendulum period as long as possible. Four smaller batteries 202 are arranged above the larger battery 201 (FIG. 31). Battery 202 might be of Burgess type CD-29 and the four batteries 202 of Burgess type CD-28. A removable front panel 203 seen in FIG. 33 may be employed to close this space.

A spring tip 204 below the batteries is adjusted to keep from jarring components more than necessary when it is set down. The spring preferably extends beyond its housing to provide lateral flexibility as well as vertical cushioning. The actual tip 205 may be of rubber or other material selected for resiliency and durability.

Immediately above the batteries 202 is located the input transformers 206 (FIG. 30). Above this compartment and closing it is beveled mirror 207 positioned behind lens 208 which corresponds to receiving lens 105'. The mirror 207 reflects light received through the lens 208 to the pick-up unit 209 arranged and mounted on a servomotor 210 which is also seen in FIG. 29. Above this location are the amplifiers 211a, 211b for the A and B channels, respectively, bracketing at the same level the lamp batteries 212. Above this are the circuit chasses shown as blocks in FIG. 27, including gate signal circuit 213, velocity feedback circuit 214, D.C. amplifier circuit 215, and stimulator circuit 216. These circuits may be miniaturized and placed on printed circuit boards. Immediately above the circuit board compartment is another lens 217 behind which is located a mirror 218 reflecting light from light source 219. The output is preferably through a tactile stimulator 220 in the handle 221 of the cane.

Between the lenses 208 and 217 is a removable front panel 223 for providing access to the circuitry and components behind the panel. The lenses in this case are preferably Fresnel lenses similar to those previously described and the lamp 219 is preferably a xenon flash lamp. Further modification of the cane structure can be made to also incorporate an obstacle detector.

Figure 34:
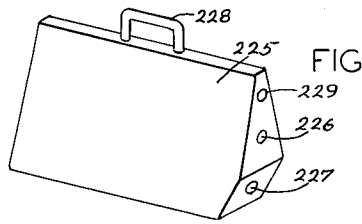
FIG. 34 shows an embodiment of the curb detector or combination curb and obstacle detector in a brief case.

Alternatively, an arrangement such as that shown in FIG. 34 involving a modified brief case 225 may be employed. The modified brief case would be provided with openings 226, 229 and 227 through which light is projected and received. Such an arrangement would have the advantage of permitting the user to carry books or other equipment as well as the combined curb and obstacle detector. Such a device would have multiple stimulators provided in the handle 228 of the brief case.

In addition to the modifications described above, it will be clear to those skilled in the art that other modifications of the systems and methods described will occur to those skilled in the art. All such modifications within the scope of the claims are intended to be within the scope and spirit of the present invention.

We claim:

1. A device for use by the blind employing energy in the visible or near visible light frequency ranges and employing a triangulation system comprising a light source, a first means for focusing light from that source into a beam that is capable of producing a small spot of light on a surface at some distance, a second means for focusing light reflected from said spot onto detector means, means to pulse the light, gate means synchronized with the pulse means to gate signals from the detector means to permit passage of any signal only when pulses of light are being emitted and to discriminate against all signals at all other times, and stimulator means responsive to signals from the detector means passing through the gate to alert the user that signals from the detector means are passing through the gate.

2. The system of claim 1 in which the pulse generating means is a relaxation oscillator device designed to keep pulse width small compared to the period between pulses.

3. The system of claim 2 in which a noble gas filled glow lamp is used to produce light pulses of a few microseconds duration.

4. The system of claim 3 in which a xenon filled lamp is employed.

5. The system of claim 1 in which the gate means is triggered by the pulse means which pulses the light.

6. The system of claim 1 in which the detector means includes a plurality of light sensitive elements positioned to receive light reflected from obstacles at different distances from the light source.

7. The system of claim 6 in which separate channels are provided for each detector and separate stimulator means for each channel.

8. The system of claim 6 in which selector switch means is provided for selecting different combinations of detectors such that the range searched for obstacle may be selected by the selector switch position.

9. The system of claim 1 in which discrimination means is provided to prevent energization of the stimulator means by signals below a predetermined level.

10. The system of claim 1 in which the device is supported on a suitable frame having a handle aligned in the same azimuthal direction as the projected light and in which the handle is inclined from the horizontal sufficiently downward to enable the horizontal carrying of the frame by the user's hand in its normal position.

11. The system of claim 1 in which the detector means is mounted upon movable means which moves to seek reflections of light from the spot.

12. The system of claim 11 in which the movable means is a servo-motor coupled to the output from the detector means in such a way as to cause it to move in such direction that the moving detector means tends to follow movements of the light spot.

13. The system of claim 12 in which the detector means consists of a pair of detector elements which detect the direction of movement of the light beam by the relative amounts of light upon each and hence the relative signals produced and a feedback circuit producing a feedback signal proportional to the difference signal for driving the servo-motor back to a position of balanced light condition.

14. The system of claim 13 in which the sum of the detector signals is used to act upon a signal stimulator output.

15. The system of claim 14 in which means is provided to prevent signals by the output stimulator unless the sum drops below a predetermined level.

16. The system of claim 12 in which a separate light source but common synchronizing means is used to generate the gate signal.

17. The system of claim 16 in which a chopper disc and drive means to rotate the disc is used to produce the pulsed outputs.

18. The system of claim 1 in which a stable platform is provided by providing horizontal axis of rotation perpendicular to the direction of travel of the user on a handle frame structure and a balanced active element frame structure rotatably supported on the handle frame free to rotate about said axis.

19. The system of claim 18 in which the frame structures are so arranged around the horizontal axis that rotation of the system about a vertical axis through its center of gravity will not produce rotation of the system about its horizontal axis.

20. The system of claim 19 in which the active element frame is a three-armed structure with its three arms symmetrically arranged about the axis of rotation and equally spaced radially from one another, the light source supported at the end of one arm, the detector means supported at the end of another arm and other components of the system supported on the third arm so that the system provides a dynamically balanced array.

21. A device for use by the blind employing visible or near visible light energy and employing a triangulation system comprising a frame support including a housing, a light source mounted in one compartment of the housing, a Fresnel lens closing said compartment and acting to focus light from the source into a beam that is capable of producing a small spot of light on a surface at some distance, a second Fresnel lens closing a second compartment of the housing, a plurality of detector elements in said second compartment positioned to receive light focused by the lens from a spot formed by the beam on objects at different distances, means within the housing for pulsing the light, a stimulator responsive to signals from the detector means, and a gate adapted to pass signals from the detectors only when triggered by the pulse means that pulses the light source.

22. The device of claim 21 in which a handle is provided rigidly connected to the frame, and the stimulator is a device in the handle adapted to act upon the user's hand.

23. The device of claim 22 in which a range switch for selectively connecting detectors receiving light signals from different ranges to the stimulator through the gate is provided on the casing in position to be manually positioned by the hand of the user.

24. The method of detection of obstacles comprising producing a narrow beam of visible or near visible light, pulsing said light beam to produce pulses of light in the order of $1/250$ of the total pulse cycle width or shorter, detecting a spot of light from the beam on an obstacle and generating a signal only if light detection occurs within an interval having coincidence at least in part with the pulse generation interval..

25. The method of detection of discontinuities in the ground surface comprising producing a narrow beam of visible or near visible light, and directing it downwardly at an angle toward the ground in advance of a walker, following the spot of light on the ground with an automatic following means having a limited angular following rate from a point above the ground below the light beam, producing a signal when the light spot is lost by the following means, and superimposing movement on the light beam relative to the ground surface so that, in addition to being lost when hidden by ground surface discontinuities, said light beam may be lost by moving it more rapidly than it can be followed by the following means.

References Cited by the Examiner
UNITED STATES PATENTS

| | | | |
|---|---|---|---|
| 2,016,036 | 10/35 | Fitz Gerald | 250—221 |
| 2,297,534 | 9/42 | Brulin | 88—1 |
| 2,433,856 | 1/48 | Marihart | 250—221 |
| 2,468,042 | 4/49 | Cranberg | 88—1 |
| 2,496,639 | 2/50 | Richardt et al. | 88—1 |
| 2,506,446 | 5/50 | Walker | 88—1 |
| 2,600,708 | 6/52 | Ulrich | 88—1 |
| 2,872,582 | 2/59 | Norton | 331—114 |
| 2,883,539 | 4/59 | Bruck et al. | 331—114 |
| 2,972,140 | 2/61 | Hirsch | 340—407 |
| 2,978,590 | 4/61 | Shepard | 250—233 |
| 3,009,142 | 11/61 | Steigerwald | 340—407 |

OTHER REFERENCES

Beurle: "Electronic Guiding Aids for Blind People," Electronics Engineering, January 1951, pages 2 to 7.

RALPH G. NILSON, *Primary Examiner.*

WALTER STOLWEIN, *Examiner.*